(12) United States Patent
Druck

(10) Patent No.: US 6,757,700 B1
(45) Date of Patent: *Jun. 29, 2004

(54) SELF-STABILIZING, PORTABLE AND EFFICIENT COMPUTER ARITHMETIC USING MAPPINGS OF D SCALE POINTS

(76) Inventor: Phillip Druck, 481 Cape May St., Englewood, NJ (US) 07631

( * ) Notice: Subject to any disclaimer, the term of this patent is extended or adjusted under 35 U.S.C. 154(b) by 0 days.

This patent is subject to a terminal disclaimer.

(21) Appl. No.: 09/568,368

(22) Filed: May 10, 2000

Related U.S. Application Data

(60) Provisional application No. 60/162,588, filed on Oct. 28, 1999.

(51) Int. Cl.[7] .............................. G06F 7/00; G06F 7/38
(52) U.S. Cl. ...................................... 708/204; 708/490
(58) Field of Search ................................ 708/204, 400, 708/403, 491, 492, 495

(56) References Cited

U.S. PATENT DOCUMENTS 4,910,699 A * 3/1990 Capps et al. ................ 708/491

6,477,553 B1 * 11/2002 Druck ........................ 708/313

* cited by examiner

*Primary Examiner*—Chuong Dinh Ngo
(74) *Attorney, Agent, or Firm*—Gottlieb Rackman & Reisman, P.C.

(57) ABSTRACT

A method and apparatus for signal and noise processing employs a D Scale, which assigns the results of arithmetic operations to a set of values of controlled density and value. The signal processor has two components, a set of mappings from pairs of points in a D Scale into a point in a D Scale, and a map of measured values, into D Scale points. A tight variance of the resolution is achieved by using prime subscales to fill in the D Scale. Fewer sample points attain the same mean resolution, with a tight variance, as a high uniform sampling rate. The invention bounds the round-off errors of sequential calculations, and decouples actual noise from the artifact created by calculation round-off errors. The invention provides a Discrete Fourier Transform (DFT) of a signal or image as an example of a continuous-to-discrete transformation.

29 Claims, 30 Drawing Sheets

D Arithmetic "Calculation" Process Flow

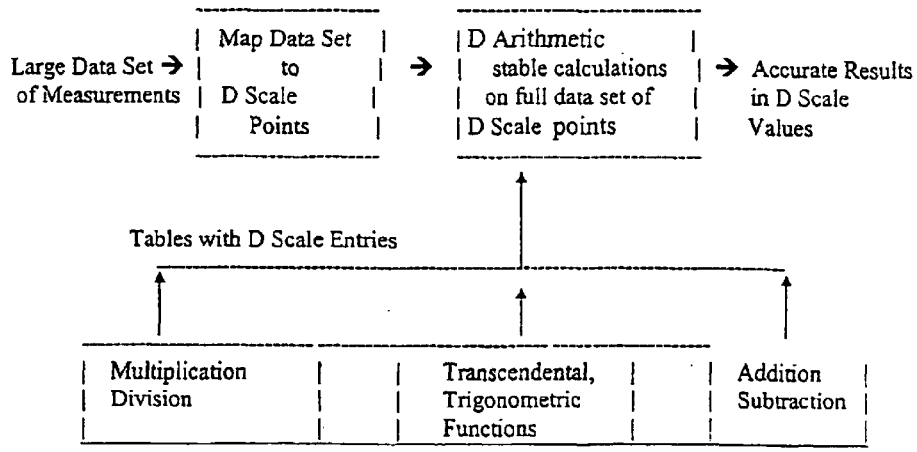

Figure 2

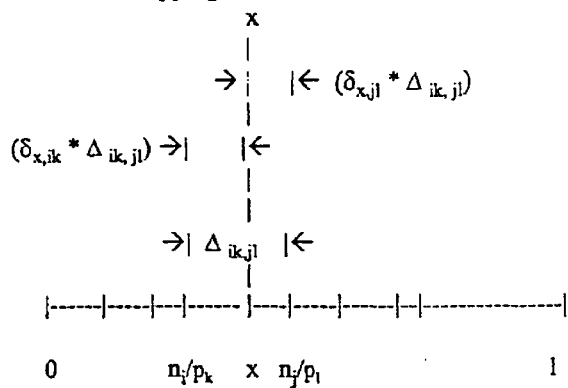

x is a measured sample point.
$n_i/p_k$ and $n_j/p_l$ are the nearest D Scale point neighbors of x.
$n_i/p_k$ is the i-th point on the unit prime sub-scale $p_k$
$n_j/p_l$ is the j-th point on the unit prime sub-scale $p_l$
$\Delta_{ik,jl}$ is the distance between these two D Scale points.
$\delta_{x,jl}$ is the fraction of the distance $\Delta_{ik,jl}$ between x and its neighbor $n_j/p_l$
$\delta_{x,jk}$ is the fraction of the distance $\Delta_{ik,jl}$ between x and its neighbor $n_i/p_k$

Figure 3

Result of Multiplying Two Normalized D Scale Points $n_i/p_k * n_j/p_l = n_b/p_n - (\delta_{x,bn} * \Delta_{am,bn})$ where $0 <= \delta_{x,am} <= \frac{1}{2}$ Therefore:
$n_i/p_k * n_j/p_l \rightarrow n_b/p_n$

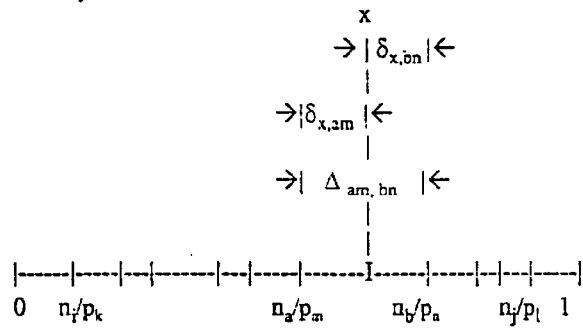

```
                         x
                  → |δ_{x,bn}|←
                        |
                → |δ_{x,am}|←
                        |
                →|  Δ_{am,bn}  |←
                        |
                        |
|------|----|--|------|---|----|--------|------|----|--|---|----|
0   n_i/p_k           n_a/p_m      n_b/p_n   n_j/p_l   1
```

$n_i/p_k$ is the i-th point on the unit prime scale $p_k$
$n_j/p_l$ is the j-th point on the unit prime scale $p_l$ $n_a/p_m$ is the a-th point on the unit prime scale $p_m$
$n_b/p_n$ is the b-th point on the unit prime scale $p_n$ $\Delta_{ik,jl}$ is the distance between these two D Scale points $n_i/p_k$, $n_j/p_l$.
$\delta_{x,ik}$ is the fraction of the distance $\Delta_{ik,jl}$ between x and its neighbor $n_i/p_k$
$\delta_{x,jl}$ is the fraction of the distance $\Delta_{ik,jl}$ between x and its neighbor $n_j/p_l$

Figure 4

D Arithmetic - Theorem on Maximum D Arithmetic Multiplication Error

The worst case error, $\varepsilon_n$, from any number, n, of iterative D Arithmetic multiplication "calculation" mappings is:

$$\varepsilon_n =< (n-1)/p_{max} \pm \sum_{k=2}^{k=n} a_k/p_{max}^k$$

where $|a_k| < p_{max}$

Figure 5

D Arithmetic - Central Theorem on Probabilistic Multiplication Error Tolerance

The error, $\varepsilon_n$, from any number, n, of D Arithmetic multiplication "calculation" mappings is self-stabilizing such that:

$\text{Probability}(\varepsilon_n > 1/p_{max}) \to 0$ as $n \to \infty$ and decreasing rapidly at the rate of $1/2^n$

Figure 6

D Arithmetic - Bounded Variance of Iterative Multiplications

The variance, $\sigma^2_n$, the error distribution, $\varepsilon_n$, resulting from many iterative D Arithmetic multiplications of n number, is bounded such that:

$$\sigma^2_n =< 1/p_{max}$$

Figure 7

D Arithmeticx Addition - Theorem on Maximum Addition Error

The worst case error, $\varepsilon_n$, from any number, n, of iterative
D Arithmetic addition "calculation" mappings is:

$$\varepsilon_n =< +- \sum_{k=0}^{k=n} 1/p_{max}$$

where:
$|a_k| < p_{max}$
$\Delta_{lk,iljl} =< p_{max}$
$\delta_{xl,lk} =< \frac{1}{2}$ $k=n$

Figure 8

D Arithmetic - Central Theorem on Probabilistic Error Tolerance
The error, $\varepsilon_n$, from any number, n, of D Arithmetic additions

Figure 9

"calculation" mappings is self-stabilizing such that:
Probability($\varepsilon_n > 1/p_{max}$) → 0 as n → ∞
decreasing rapidly at the rate of $1/2^n$

Figure 10

D Arithmetic - Bounded Variance of Iterative Calculation
The variance, $\sigma^2_n$, the error distribution, $\varepsilon_n$, resulting from many iterative
D Arithmetic additions of n number, n, is bounded such that:
$\sigma^2_n =< 1/p_{max}$

Figure 11

Noise Processing Components

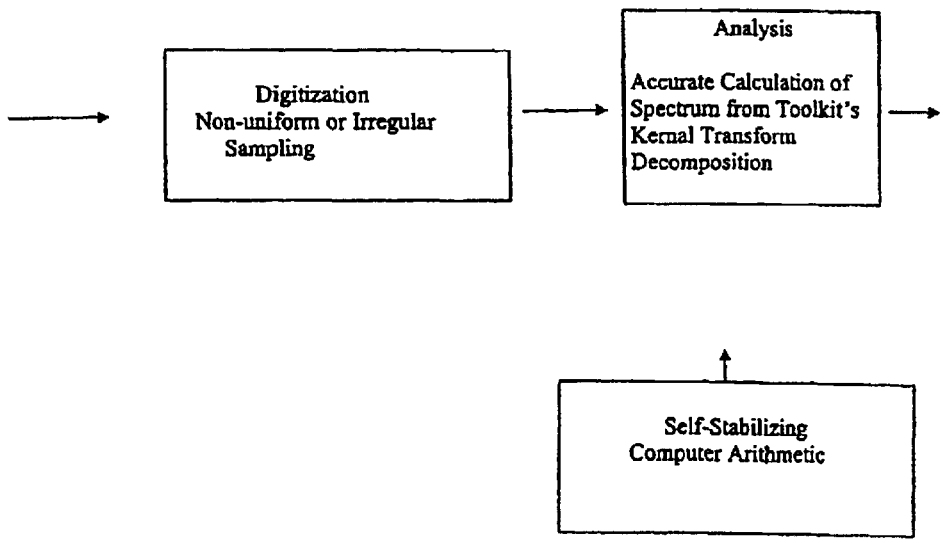

Figure 12

D Fourier Transform Decomposition

IF:

(1) $Fn(\omega_m) = \frac{1}{2}\pi \int_{-\infty}^{+\infty} h(t) e^{j\omega_m t} dt = \frac{1}{2}\pi \int_{0}^{T_{pmax}} h(t) e^{j\omega_m t} dt$

THEN:

$\{max\ prime\}\quad n = (T_{pk} * p_k) - 1$

(11) $F(2\pi m/T_{pi}) = \frac{1}{2}\pi \sum_{k=\{min\ prime\}} \sum \delta_{p_k, n\%p_k} h(n/p_k) e^{j2\pi(T_{pk}/T_{pi})nm/T_{pk}} * p_k$ $\qquad n = 0$ where:

The prime scales associated with prime numbers $p_i$ are components of a D Scale $T_{pj}$ is the observation length, in units of time, on prime scale $p_j$.

$T_{pj}$ must be a prime number. $T_{pmax}$ is the maximum value.

$m = 0, \ldots, p_j - 1$ for each frequency prime scale $p_i$ where i=min to max prime scales.

$\delta_{p_k, n\%p_k}$ is the interval between a point on the D Scale located by $(p_k, n\%p_k)$ and its next, right, nearest neighbor on the same D Scale. {max prime scale} has a greater bandwidth than the function being transformed.

Figure 13

Mathematica Figures
for
SELF-STABILIZING, PORTABLE AND EFFICIENT COMPUTER
ARITHMETIC USING MAPPINGS OF D SCALE POINTS
by
Philip Druck // NOTE: List of primes whose subscales comprise this D Scale ™:
p= {2, 3, 5, 7, 11, 13, 17, 19, 23, 31, 37};    // Mathematica notation.

Figure 14

// NOTE: List of points in this D Scale ™:
scale $\{0, \frac{1}{37}, \frac{1}{31}, \frac{1}{23}, \frac{1}{19}, \frac{2}{37}, \frac{1}{17}, \frac{2}{31}, \frac{1}{13}, \frac{3}{37}, \frac{2}{23}, \frac{1}{11},$
$\frac{3}{31}, \frac{2}{19}, \frac{4}{37}, \frac{2}{17}, \frac{4}{31}, \frac{3}{23}, \frac{5}{37}, \frac{1}{7}, \frac{2}{13}, \frac{3}{19}, \frac{5}{31}, \frac{6}{37},$
$\frac{4}{23}, \frac{3}{17}, \frac{2}{11}, \frac{7}{37}, \frac{6}{31}, \frac{1}{5}, \frac{4}{19}, \frac{8}{37}, \frac{5}{23}, \frac{7}{31}, \frac{3}{13}, \frac{4}{17},$
$\frac{9}{37}, \frac{8}{31}, \frac{6}{23}, \frac{5}{19}, \frac{10}{37}, \frac{3}{11}, \frac{2}{7}, \frac{9}{31}, \frac{5}{17}, \frac{11}{37}, \frac{7}{23}, \frac{4}{13},$
$\frac{6}{19}, \frac{10}{31}, \frac{12}{37}, \frac{1}{3}, \frac{8}{23}, \frac{13}{37}, \frac{6}{17}, \frac{11}{31}, \frac{4}{11}, \frac{7}{19}, \frac{14}{37},$
$\frac{5}{13}, \frac{12}{31}, \frac{9}{23}, \frac{2}{5}, \frac{15}{37}, \frac{7}{17}, \frac{13}{31}, \frac{8}{19}, \frac{3}{7}, \frac{16}{37}, \frac{10}{23},$
$\frac{14}{31}, \frac{5}{11}, \frac{17}{37}, \frac{6}{13}, \frac{8}{17}, \frac{9}{19}, \frac{11}{23}, \frac{15}{31}, \frac{18}{37}, \frac{1}{2}, \frac{19}{37},$
$\frac{16}{31}, \frac{12}{23}, \frac{10}{19}, \frac{9}{17}, \frac{7}{13}, \frac{20}{37}, \frac{6}{11}, \frac{17}{31}, \frac{13}{23}, \frac{21}{37}, \frac{4}{7},$
$\frac{11}{19}, \frac{18}{31}, \frac{10}{17}, \frac{22}{37}, \frac{3}{5}, \frac{14}{23}, \frac{19}{31}, \frac{8}{13}, \frac{23}{37}, \frac{12}{19}, \frac{7}{11},$
$\frac{20}{31}, \frac{11}{17}, \frac{24}{37}, \frac{15}{23}, \frac{2}{3}, \frac{25}{37}, \frac{21}{31}, \frac{13}{19}, \frac{9}{13}, \frac{16}{23}, \frac{26}{37},$
$\frac{12}{17}, \frac{22}{31}, \frac{5}{7}, \frac{8}{11}, \frac{27}{37}, \frac{14}{19}, \frac{17}{23}, \frac{23}{31}, \frac{28}{37}, \frac{13}{17}, \frac{10}{13},$
$\frac{24}{31}, \frac{18}{23}, \frac{29}{37}, \frac{15}{19}, \frac{4}{5}, \frac{25}{31}, \frac{30}{37}, \frac{9}{11}, \frac{14}{17}, \frac{19}{23}, \frac{31}{37},$
$\frac{26}{31}, \frac{16}{19}, \frac{11}{13}, \frac{6}{7}, \frac{32}{37}, \frac{20}{23}, \frac{27}{31}, \frac{15}{17}, \frac{33}{37}, \frac{17}{19}, \frac{28}{31},$
$\frac{10}{11}, \frac{21}{23}, \frac{34}{37}, \frac{12}{13}, \frac{29}{31}, \frac{16}{17}, \frac{35}{37}, \frac{18}{19}, \frac{22}{23}, \frac{30}{31}, \frac{36}{37}, 1\}$

Figure 15

// NOTE: Distribution of differences between adjacent D Scale ™ points:
delta = N[ Table[scale[[i+1]] - scale[[i]],
    {i, 1, Length[scale] - 1}] ];

// NOTE: Graph of distribution of differences between adjacent D Scale ™ points:

// NOTE: The 20th row in the D Arithmetic ™ multiplication table.
Print[mul[[20]]];

$\{\frac{1}{37}, \frac{1}{23}, \frac{1}{23}, \frac{2}{31}, \frac{1}{13}, \frac{1}{13}, \frac{2}{23}, \frac{1}{11}, \frac{1}{37}, \frac{1}{37}, \frac{1}{37},$
$\frac{1}{37}, \frac{1}{37}, \frac{1}{37}, \frac{1}{37}, \frac{1}{37}, \frac{1}{37}, \frac{1}{37}, \frac{1}{37}, \frac{1}{37}, \frac{1}{37}, \frac{1}{37},$
$\frac{1}{37}, \frac{1}{37}, \frac{1}{37}, \frac{1}{37}, \frac{1}{37}, \frac{1}{37}, \frac{1}{37}, \frac{1}{37}, \frac{1}{31}, \frac{1}{31}, \frac{1}{31},$
$\frac{1}{31}, \frac{1}{31}, \frac{1}{31}, \frac{1}{31}, \frac{1}{31}, \frac{1}{31}, \frac{1}{31}, \frac{1}{23}, \frac{1}{23}, \frac{1}{23}, \frac{1}{23},$
$\frac{1}{23}, \frac{1}{23}, \frac{1}{23}, \frac{1}{23}, \frac{1}{23}, \frac{1}{23}, \frac{1}{23}, \frac{1}{23}, \frac{1}{19}, \frac{1}{19}, \frac{1}{19},$
$\frac{1}{19}, \frac{1}{19}, \frac{1}{19}, \frac{2}{37}, \frac{2}{37}, \frac{2}{37}, \frac{2}{37}, \frac{1}{17}, \frac{1}{17}, \frac{1}{17}, \frac{1}{17},$
$\frac{1}{17}, \frac{1}{17}, \frac{2}{31}, \frac{2}{31}, \frac{2}{31}, \frac{2}{31}, \frac{2}{31}, \frac{2}{31}, \frac{2}{31}, \frac{2}{31}, \frac{2}{31},$
$\frac{2}{31}, \frac{2}{31}, \frac{1}{13}, \frac{1}{13}, \frac{1}{13}, \frac{1}{13}, \frac{1}{13}, \frac{1}{13}, \frac{1}{13}, \frac{1}{13}, \frac{1}{13},$
$\frac{1}{13}, \frac{3}{37}, \frac{3}{37}, \frac{3}{37}, \frac{3}{37}, \frac{3}{37}, \frac{2}{23}, \frac{2}{23}, \frac{2}{23}, \frac{2}{23},$
$\frac{2}{23}, \frac{2}{23}, \frac{2}{23}, \frac{1}{11}, \frac{1}{11}, \frac{1}{11}, \frac{1}{11}, \frac{1}{11}, \frac{1}{11}, \frac{3}{31},$
$\frac{3}{31}, \frac{3}{31}, \frac{3}{31}, \frac{3}{31}, \frac{3}{31}, \frac{3}{31}, \frac{3}{31}, \frac{2}{19}, \frac{2}{19}, \frac{2}{19},$
$\frac{2}{19}, \frac{2}{19}, \frac{2}{19}, \frac{2}{19}, \frac{4}{37}, \frac{4}{37}, \frac{4}{37}, \frac{4}{37}, \frac{4}{37}, \frac{4}{37},$
$\frac{4}{37}, \frac{2}{17}, \frac{2}{17}, \frac{2}{17}, \frac{2}{17}, \frac{2}{17}, \frac{2}{17}, \frac{2}{17}, \frac{2}{17}, \frac{2}{17},$
$\frac{2}{17}, \frac{2}{17}, \frac{4}{31}, \frac{4}{31}, \frac{4}{31}, \frac{4}{31}, \frac{4}{31}, \frac{4}{31}, \frac{4}{31}, \frac{3}{23},$
$\frac{3}{23}, \frac{3}{23}, \frac{3}{23}, \frac{5}{37}, \frac{5}{37}, \frac{5}{37}, \frac{5}{37}, \frac{5}{37}, \frac{5}{37}, \frac{5}{37}, \frac{1}{7}\}$

Figure 18

// NOTE: The 20th row of the order-of-magnitude corresponding to a cell in the
//       D Arithmetic ™ row.
Print[mulexp[[20]]];
{0, -1, -1, -1, -1, -1, -1, -1, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0,
 0, 0, 0, 0, 0, 0, 0, 0, 0, 0, 0, 0, 0, 0, 0, 0, 0, 0}

Figure 19

NOTE: Differences between Measurements and Mapped Values
ListPlot[
  Table[{i, dmms[[i]] - ndiff2[[i]]}, {i, 1, 85}],
  PlotJoined -> True, PlotRange -> {0.025, -0.025}];

NOTE: Array of Actual Measurement Values
Print[drums]
{0.488879999999999981`, 0.488879999999999981`,
 0.488879999999999981`, 0.488879999999999981`,
 0.488879999999999981`, 0.488879999999999981`,
 0.488879999999999981`, 0.488879999999999981`,
 0.488879999999999981`, 0.488879999999999981`,
 0.488879999999999981`, 0.488879999999999981`,
 0.488879999999999981`, 0.488879999999999981`,
 0.488879999999999981`, 0.488879999999999981`,
 0.488879999999999981`, 0.488879999999999981`, NOTE: Array of D Scale ™ Mapped Measurement Values, in Decimal Print[ndiff2]

{0.486486486486486491`, 0.486486486486486491`,
 0.5`, 0.5`, 0.5`, 0.5`, 0.486486486486486491`,
 0.486486486486486491`, 0.5`, 0.486486486486486491`,
 0.5`, 0.486486486486486491`, 0.486486486486486491`,
 0.486486486486486491`, 0.486486486486486491`,
 0.486486486486486491`, 0.486486486486486491`,
 0.486486486486486491`, 0.5`, 0.486486486486486491`,
 0.5`, 0.486486486486486491`, 0.5`, 0.5`, 0.5`,
 0.5`, 0.5`,

NOTE: Array of D Scale ™ Mapped Measurement Values, as Fractions
Print[nums2]

$\{\frac{18}{37}, \frac{18}{37}, \frac{1}{2}, \frac{1}{2}, \frac{1}{2}, \frac{1}{2}, \frac{18}{37}, \frac{18}{37}, \frac{1}{2}, \frac{18}{37}, \frac{1}{2}, \frac{18}{37},$
$\frac{18}{37}, \frac{18}{37}, \frac{18}{37}, \frac{18}{37}, \frac{18}{37}, \frac{18}{37}, \frac{1}{2}, \frac{18}{37}, \frac{1}{2}, \frac{18}{37}, \frac{1}{2}, \frac{1}{2},$
$\frac{1}{2}, \frac{1}{2}, \frac{1}{2}, \frac{18}{37}, \frac{1}{2}, \frac{18}{37}, \frac{18}{37}, \frac{1}{2}, \frac{1}{2}, \frac{1}{2}, \frac{1}{2}, \frac{1}{2}, \frac{18}{37},$
$\frac{1}{2}, \frac{1}{2}, \frac{1}{2}, \frac{1}{2}, \frac{1}{2}, \frac{1}{2}, \frac{18}{37}, \frac{18}{37}, \frac{1}{2}, \frac{1}{2}, \frac{1}{2}, \frac{18}{37}, \frac{18}{37},$

Figure 21

(D Arithmetic ™ - Benchmark) vs. Number of Iterative Multiplications - 300 Iterations (D Arithmetic ™ - Benchmark) vs. Number of Iterative Multiplications - 800 Iterations (Limited Precision - Benchmark) vs. Number of Iterative Multiplications - 350 Iterations (Limited Precision - Benchmark) vs. Number of Iterative Multiplications - 800 Iterations

```
ListPlot[
  Table[{i, drums[[i]] - ndiff2[[i]]}, {i, 1, 85}],
  PlotJoined-> True, PlotRange-> {0.025, -0.025}];
```

(Measurement - Mapped Values) vs. Measurement Number

```
// NOTE: List of about 85 randomly generated floating point numbers between 0-1:
dnums = Table[Random[], {i, 1, calcNum}];
Print[dnums]
         {0.838895216134902987`, 0.306105288834480804`,
          0.962759744944044904`, 0.0521228109337564582`,
          0.768639686131717159`, 0.733644322490757794`,
          0.400215768057974Z3`, 0.0731269564751291767`,
          0.198122198333079815`, 0.972347094452212701`,
          0.840611229827024253`, 0.54480014890693873`,
          0.991216810072027598`, 0.366283188771415169`,
          0.309175330118401658`, 0.530855384490237192`,
          0.324424491129125014`, 0.935415106177409505`,
          0.517487633587528161`, 0.353110743694430473`,
          0.432838097006086908`, 0.488733385209483195`,
          0.850297035482702057`, 0.835758417547748777`,
          0.593942880871183831`, 0.182628096375002453`,
          0.887537290538656975`, 0.78363560661399223`,
          0.825303194739466761`, 0.448983773884244641`,
          0.487321522480682833`, 0.710508650138863018`,
          0.627180996406386803`, 0.476636679432031939`,
          0.646710292653658669`, 0.165708501231924332`,
          0.635964186334359382`, 0.110353490660616704`,
          0.337534962535256966`, 0.634853116741687095`,
          0.311539695205234279`, 0.174938384483207132`,
          0.820047328947728715`, 0.281742373047256613`,
          0.878701598199147326`, 0.686204999273723892`,
          0.969750293465026658`, 0.445983955499507978`,
          0.28475871732796353`, 0.503576902898721368`,
          0.0822130029263696826`, 0.662348348885515747`,
          0.459455522588496911`, 0.0545931290144767622`,
          0.594891480445686848`, 0.951839698746652729`,
          0.83227452618210993`, 0.577956449582444875`,
          0.948181187792028268`, 0.786131197514728441`,
          0.19631033984775069`, 0.467602958921828104`,
          0.610646225256771302`, 0.151278080773041345`,
          0.884770644642516401`, 0.292664574438620981`,
          0.790598896309042586`, 0.869535707725784767`,
          0.00606904644336896481`, 0.606459575164897124`,
          0.820848602844015751`, 0.4235517522262767`,
          0.72131032911540549`, 0.102882672266175689`,
          0.738635599917646068`, 0.761203403340760864`,
          0.261854806526908578`, 0.0482895432516989231`,
          0.143744119471959175`, 0.809363704594108135`,
          0.429580280344798559`, 0.470333093669254065`,
          0.195562931679930898`, 0.0232325070793797117`,
          0.233269940497047878`,
```

Figure 27(a)

// NOTE: List of D Scale ™ numbers to which the corresponding randomly
//            generated floating point numbers were mapped to:
Print[nums2]

$$\left\{ \frac{26}{31}, \frac{4}{13}, \frac{22}{23}, \frac{1}{19}, \frac{10}{13}, \frac{14}{19}, \frac{2}{5}, \frac{1}{13}, \frac{1}{5}, \frac{30}{31}, \frac{16}{19}, \frac{6}{11}, \right.$$

$$\frac{36}{37}, \frac{7}{19}, \frac{4}{13}, \frac{7}{13}, \frac{1}{3}, \frac{29}{31}, \frac{16}{31}, \frac{11}{31}, \frac{16}{37}, \frac{1}{2}, \frac{11}{13}, \frac{19}{23},$$

$$\frac{10}{17}, \frac{2}{11}, \frac{33}{37}, \frac{18}{23}, \frac{19}{23}, \frac{10}{23}, \frac{18}{37}, \frac{22}{31}, \frac{23}{37}, \frac{9}{19}, \frac{20}{31},$$

$$\frac{4}{23}, \frac{12}{19}, \frac{4}{37}, \frac{8}{23}, \frac{12}{19}, \frac{4}{13}, \frac{3}{17}, \frac{14}{17}, \frac{3}{11}, \frac{27}{31}, \frac{13}{19},$$

$$\frac{36}{37}, \frac{14}{31}, \frac{3}{11}, \frac{19}{37}, \frac{3}{37}, \frac{2}{3}, \frac{5}{11}, \frac{1}{17}, \frac{22}{37}, \frac{18}{19}, \frac{19}{23}, \frac{4}{7},$$

$$\frac{18}{19}, \frac{15}{19}, \frac{1}{5}, \frac{8}{17}, \frac{14}{23}, \frac{2}{13}, \frac{33}{37}, \frac{9}{31}, \frac{15}{19}, \frac{20}{23}, \frac{2}{31}, \frac{3}{5},$$

$$\frac{9}{11}, \frac{8}{19}, \frac{5}{7}, \frac{2}{19}, \frac{17}{23}, \frac{28}{37}, \frac{6}{23}, \frac{1}{23}, \frac{1}{7}, \frac{30}{37}, \frac{16}{37}, \frac{6}{13},$$

$$\left. \frac{6}{31}, \frac{1}{37}, \frac{3}{13}, \frac{1}{37}, \frac{18}{31}, \frac{15}{17}, \frac{13}{37}, \frac{5}{7}, \frac{15}{19}, \frac{1}{37}, \frac{8}{23} \right\}$$

Figure 27(b)

// NOTE: Same list of D Scale tm numbers to which the corresponding randomly
//       generated floating point numbers were mapped to, expressed as decimals:
Print[ndiff2]

// NOTE: Iterative floating point multiplication operations using the built-in, high
//       precision, randomly generated numbers stored in array "dnums[]".

```
numTrials = 399;
res2 = dnums[[1]];
num22 = 0;
ff = Table[Null, {0}];
Clear[ff];

Do[
  res2 = dnums[[1]];
  num22 = 1 * k;
  Do[

If[Equal[dnums[[i]], 0],
        Print["decnum=0"]; Continue[], Null];
    res2tmp = res2 * dnums[[i]];
    res2 = res2tmp , {i, 2, k}
  ];

ff[k] = Append[ff[k], num22];
  ff[k] = Append[ff[k], res2]

, {k, 1, numTrials - 1}
];
Do[ff[q] = Delete[ff[q], 1], {q, numTrials}];
approx2 = Table[ ff[j], {j, 1, numTrials}];
```

Figure 28

// NOTE: Values of Iterative floating point multiplication operations using built-in,
// high precision, randomly generated numbers stored in array "dnums[]".

// NOTE: Iterative floating point multiplication operations using the D Scale ™
//       mappings of the randomly generated floating point numbers. These
//       numbers are stored in array "ndiffs2[]".

```
res3 = ndiff2[[1]];
num33 = 0;
ffg = Table[Null, {0}];
Clear[ffg];

Do[
  res3 = ndiff2[[1]];
  num33 = k;
  Do[

If[Equal[ndiff2[[i]], 0],
        Print["decnum=0"]; Continue[], Null];
    res3tmp = res3 * ndiff2[[i]];
    res3 = res3tmp {i, 2, 1 * k}
  ]

ffg[k] = Append[ffg[k], num33];
  ffg[k] = Append[ffg[k], res3]

{k, 1, numTrials - 1}
]
Do[ffg[q] = Delete[ffg[q], 1], {q, numTrials}];
approx3 = Table[ ffg[j], {j, 1, numTrials}];
```

Figure 30

// NOTE: Values of iterative floating point multiplication operations using the
//       D Scale ™ mappings of the randomly generated floating point numbers.
ffg[1, 0.838709677419354804`]
ffg[2, 0.258064516129032295`]
ffg[3, 0.246844319775596ll`]
ffg[4, 0.0129918063039787412`]
ffg[5, 0.00999369715690672677`]
ffg[6, 0.00736377685245758772`]
ffg[7, 0.00294551074098303544`]
ffg[8, 0.000226577749306387365`]
ffg[9, 0.0000453155498612774731`]
ffg[10, 0.0000438537579302685287`]
ffg[11, 0.0000369294803623313949`]
ffg[12, 0.0000201433529249080311`]
ffg[13, 0.0000195989379809915966`]
ffg[14, 7.22066136141795666`*^-6]
ffg[15, 2.22174195735937152`*^-6]
ffg[16, 1.19632259242427686`*^-6]
ffg[17, 3.98774197474758906`*^-7]
ffg[18, 3.73046829895742249`*^-7]
ffg[19, 1.92540299301028206`*^-7]
ffg[20, 6.83207513648809694`*^-8]
ffg[21, 2.95441086983269141`*^-8]
ffg[22, 1.4772054349163457`*^-8]
ffg[23, 1.24994306031383084`*^-8]
ffg[24, 1.03256165852012093`*^-8]
ffg[25, 6.07389210894188913`*^-9]
ffg[26, 1.10434401980761598`*^-9]
ffg[27, 9.84955477125711631`*^-10]
ffg[28, 7.70834721228817887`*^-10]
ffg[29, 6.37765088411974O8`*^-10]
ffg[30, 2.76859351670085818`*^-10]

.
.

ffg[76, 5.35033864215458798`*^-28]
ffg[77, 1.39574051534467491`*^-28]
ffg[78, 6.06843702323771871`*^-30]
ffg[79, 8.66919574748245302`*^-31]
ffg[80, 7.02907763309388222`*^-31]
ffg[81, 3.03960113863519154`*^-31]

Figure 31

// NOTE: Iterative floating point multiplication operations using the randomly
//       generated floating point numbers, after each number was rounded to 3
//       significant digits.

```
fff = Table[Null, {0}];
res44 = drums[[1]];
res24 = res44;
mm444 = 0;
prec = 3;
Clear[fff];
Do[
    ax2 = SetPrecision[ drums[[1]], prec];
    bx2 = ax2 * 10^prec;
    res44 = N[IntegerPart[bx2] * 10^-prec];

mm444 = 1 * k;
    offs2 = 0;
    Do[

If[Equal[drums[[i]], 0],
            Print["decnum=0"]; Continue[], Null];

ax1 = SetPrecision[ drums[[i]], prec];
        bx1 = ax1 * 10^prec;
        cx1 = N[IntegerPart[bx1] * 10^-prec];

ax3 = SetPrecision[ res44, prec];
        bx3 = ax3 * 10^prec;
        If[Equal[bx3, 0.0],
            bx3 = bx3 * 10^prec,
            Null
        ];
        cx3 = N[IntegerPart[bx3] * 10^-prec];
        result44t = cx3 * cx1;

ax4 = SetPrecision[ result44t, prec];
        bx4 = ax4 * 10^prec;
        cx4 = N[IntegerPart[bx4] * 10^-prec];

If[Equal[cx4, 0],
            Continue[],
            Null
        ];

offs2 = offs2 - MantissaExponent[cx4][[2]];
        res44 = MantissaExponent[cx4][[1]];

drumslast = drums[[i]];
        res24tmp4 = res24 * drums[[i]];
        res24 = res24tmp4
        , {i, 2, 1 + k}
    ];

fff[k] = Append[fff[k], mm444];
    ax = N[res44, prec];
    bx = ax * 10^prec;
    cx = N[IntegerPart[bx] * 10^-prec];
    fff[k] = Append[fff[k], ax];
    fff[k] = Append[fff[k], cx * 10^offs2];
    fff[k] = Append[fff[k], offs2];
    fff[k] = Append[fff[k], drumslast];
    fff[k] = Append[fff[k], res24]
    , {k, 1, numTrials}
];
Do[fff[q] = Delete[fff[q], 1], {q, numTrials}];
```

Figure 32

// NOTE: Values of iterative floating point multiplications using the randomly
// generated floating point numbers, after each number was rounded to 3 sig. digits.

fff[1, 0.8379999999999999`, 0.8379999999999999`,
    0, 0.352556224536643414`, 0.838895216134902987`]
fff[2, 0.256000000000000005`, 0.256000000000000005`,
    0, 0.306105288834480804`, 0.256790262436838645`]
fff[3, 0.245999999999999996`, 0.245999999999999996`,
    0, 0.962759744944044904`, 0.075677592512919789`]
fff[4, 0.119999999999999996`, 0.0119999999999999996`,
    -1, 0.0521228109337564582`, 0.00116247572577736746`]
fff[5, 0.909999999999999964`, 0.00908999999999999985`,
    -2, 0.768639686131717159`, 0.0000137253453980815Ol`]
fff[6, 0.666000000000000014`, 0.00666000000000000014`,
    -2, 0.733644322490757794`, 1.18890795404715943`*^-7]
fff[7, 0.266000000000000014`, 0.00266000000000000014`,
    -2, 0.400215768057974423`, 4.12161458585791873`*^-10]
fff[8, 0.19`, 0.000190000000000000035`, -3,
    0.0731269564751291767`, 1.04487424037698528`*^-13]
fff[9, 0.370000000000000017`,
    0.0000370000000000000062`, -4, 0.198122198333079815`,
    5.24799974128445079`*^-18]
fff[10, 0.358000000000000007`,
    0.0000358000000000000007`, -4, 0.972347094452212701`,
    2.56297817632047841`*^-22]
fff[11, 0.298999999999999985`,
    0.0000298999999999999985`, -4, 0.840611229827024253`,
    1.05218280197267732`*^-26]
fff[12, 0.16200000000000001`,
    0.0000162000000000000028`, -4, 0.54480014890693873`,
    2.35328597907681169`*^-31]
fff[13, 0.160000000000000008`,
    0.0000160000000000000008`, -4, 0.991216810072027598`,
    5.21707252706909585`*^-36]
fff[14, 0.580000000000000071`,
    5.79999999999999982`*^-6, -5, 0.366283188771415169`,
    4.23639091144296031`*^-41]
fff[15, 0.179000000000000003`,
    1.79000000000000003`*^-6, -5, 0.309175330118401658`,
    1.06357963785196596`*^-46]

Figure 33(a)

fff[16, 0.93999999999999857`,
9.3999999999999857`*^-7, -6, 0.530855384490237192`,
1.4174907304460385`*^-52]
fff[17, 0.304000000000000003`,
3.03999999999999914`*^-7, -6, 0.324424491129125014`,
6.12892169891323845`*^-59]
fff[18, 0.282999999999999971`,
2.82999999999999971`*^-7, -6, 0.935415106177409505`,
2.47886170084653834`*^-65]
fff[19, 0.145`, 1.45`*^-7, -6, 0.517487633587528161`,
5.18824526059033974`*^-72]
fff[20, 0.5`, 5.`*^-8, -7, 0.353110743694430473`,
3.83441954800494144`*^-79]
fff[21, 0.214999999999999991`,
2.14999999999999946`*^-8, -7, 0.432838097006086908`,
1.22660361708259668`*^-86]
fff[22, 0.104000000000000003`,
1.04000000000000003`*^-8, -7, 0.488733385209483195`,
1.9177008403696556`*^-94]
fff[23, 0.869999999999999928`,
8.69000000000000127`*^-9, -8, 0.850297035482702057`,
2.54934223521493263`*^-102]
fff[24, 0.725`, 7.25`*^-9, -8, 0.835758417547748777`,
2.83241041659388859`*^-110]
fff[25, 0.429000000000000003`,
4.28999999999999914`*^-9, -8, 0.593942880871183831`,
1.86908437062445678`*^-118]
fff[26, 0.770000000000000017`,
7.70000000000000017`*^-10, -9, 0.182628096375002453`,
2.25252293275280468`*^-127]
fff[27, 0.682000000000000028`,
6.82000000000000206`*^-10, -9, 0.887537290538656975`,
2.4093292092742633`*^-136]
fff[28, 0.533999999999999985`,
5.34000000000000163`*^-10, -9, 0.78363560661399223`,
2.01946918885460524`*^-145]

Figure 33(b)

fff[29, 0.440000000000000035`,
  4.3999999999999946`*^-10, -9, 0.825303194739466761`,
  1.39698532340660431`*^-154]
fff[30, 0.197000000000000028`,
  1.97000000000000028`*^-10, -9, 0.448983773884244641`,
  4.338874629481431.98`*^-164]

. 
. 
.

fff[76, 0.167000000000000001`,
  1.6699999999999992`*^-28, -27, 0.761203403340760864`,
  2.67705307107379477 93831`12.6571*^-1009]
fff[77, 0.429999999999999893`,
  4.28999999999999914`*^-29, -28, 0.261854806526908578`,
  3.82222430416484534482492`12.6407*^-1037]
fff[78, 0.2`, 2.`*^-30, -29, 0.0482895432516989231`,
  2.63529025521647676725157`12.6248*^-1066]
fff[79, 0.280000000000000035`,
  2.80000000000000035`*^-31, -30, 0.143744119471959175`,
  2.61174534528343011021419`12.6092*^-1096]
fff[80, 0.226000000000000023`,
  2.26000000000000023`*^-31, -30, 0.809363704594108135`,
  2.09496575129613916901615`12.594*^-1126]
fff[81, 0.959999999999999964`,
  9.60000000000000142`*^-32, -31, 0.429580280344798559`,
  7.21883911151569478857522`12.5791*^-1157]
fff[82, 0.45`, 4.5`*^-32, -31, 0.470333093669254065`,
  1.16993931557226642509778 4`12.5645*^-1187]
fff[83, 0.869999999999999928`,
  8.6899999999999995`*^-33, -32, 0.195562931679930898`,
  3.70805227156645439742496`12.5503*^-1219]
fff[84, 0.19`, 1.90000000000000035`*^-34,
  -33, 0.0232325070793797117`,
  2.73038844848512374280401`12.5363*^-1252]
fff[85, 0.439999999999999946`,
  4.38999999999999968`*^-35, -34, 0.233269940497047878`,
  4.69880822291591345 6055`12.5226*^-1286]

Figure 33(c)

(D Arithmetic ™ - Benchmark) vs. Number of Iterative Multiplications (Limited Precision - Benchmark) vs. Number of Iterative Multiplications

US 6,757,700 B1

SELF-STABILIZING, PORTABLE AND EFFICIENT COMPUTER ARITHMETIC USING MAPPINGS OF D SCALE POINTS

This application claims the benefit of provisional application No. 60/162,588 filed Oct. 28, 1999.

FIELD OF THE INVENTION

The invention relates to a method of computer calculations that avoids round off errosion. It further relates to optimizing noise processing operations, such as spectral analysis, filtering, cancellation, in telecommunications, medical or instrumentation systems. It performs the usual arithmetic (+/*−) and transcendental/trigonometric operations on floating point numbers, the most prevalent representation of real numbers on diverse computer architectures. These properties stem directly from the behavior of the D Scale.

BACKGROUND OF THE INVENTION

Digital numerical calculation involves round off errors that accumulate when repetitive operations are performed. Where a limited number of calculations are involved, the calculation may be carried out to 16 significant digits and results displayed to 12 digits. However, where billions of calculations are performed, this may be insufficient. It is also known that single non linear model sof physical systems create such problems and may appear to be chaotic, thereby limiting the ability to forecast.

Current State-of-the-Art

Review of Current Floating Point Computer Arithmetic

The mathematical foundation of computer arithmetic is Boolean algebra. This is a self-consistent set of rules specifying the results (or mappings) of logical operations on bits. A bit is the basic unit of computation having values of 0 or 1 (i.e, true or false). The rules are often implemented, or regarded, as logical truth tables. These operations also have corresponding counterparts in the mathematical theory of sets (e.g., union corresponding to + and intersection corresponding to *). Such operations include negation and basic arithmetic (addition, subtraction, multiplication, division).

From that foundation, many approaches evolved to perform calculations on groups of bits, in the form of real numbers. A real number is either rational, expressible as a fraction, or irrational. And a real number is represented in a computer as a sequence of 0/1 bits. Many algorithms are used to perform the calculations or computations on these blocks of bits.

Out of the many arithmetic techniques that evolved over the years, floating point arithmetic emerged as the clear winner. Therefore, this presentation will focus exclusively on floating point computations as the benchmark from which to measure the merits of the D Arithmetic. The integer arithmetic will also be mentioned because of its frequent use in real-time calculations.

A floating point number is conveniently expressed in scientific notation, having three components. They are the sign, the mantissa, and the power [not correct term]. Or, in the usual base 10 notation:

$$x = 0.n_1 \ldots n_s * 10^s$$

s indicates the number of significant digits. A significant digit is one that has physical significance because it was actually measured during sampling.

Over the years, standard packaging of real numbers evolved to improve computational efficiency. These special packaging are referred to as "data types".

There is also an "infinite precision" number which uses so many bits to represent a real number, that the precision is effectively "infinite". Then the round-off errors effectively disappear, to provide the truest representation of multiple calculations on measured numbers. Until recent advances in computer CPU processing speed and memory capacity/price, it was not commercially feasible to work with infinite precision numbers. They require much more memory and processing time to implement, vis-a-vis the native data types.

Over time, the native data types were considered the golden compromise between the conflicting constraints of calculation efficiency vs. accuracy. But infinite precision numbers were increasingly used for more exacting calculations in scientific and even in financial applications. Indeed, packaging of indefinite and otherwise custom precision numbers is occurring more frequently. For example, the Java language packaged an infinite precision arithmetic in its Big Decimal object. Another commercial example is the packaging of a Money object to precisely handle arithmetic on currency sub-units (like cents).

Infinite precision arithmetic also serves as a useful benchmark against which the other restricted precision calculations can be compared. Because the infinite precision calculations do not have inherent rounding errors, they provide true values.

The following floating point representation will be used to show how the current standard floating point arithmetic can destabilize. A "double" data type is indicated, resulting from n calculations. In scientific notation, it is:

$$0.n_1 \ldots n_s \ldots n_b \ldots n_c * 10^s$$

Here, s again indicates the number of significant digits maintained from the actual original data measured. The first s digits are significant. The digits from s+1 until b are the buffer zone that will absorb the effect of round-off, errors. This buffer, in effect, shields the significant digits from the ripple effect of round-off. The digits from b+1 until c are the digits already corrupted by the rippling effect of previous round-off operations.

Note that the round-off error is generally indeterminate, and not calculable to a definite value. That increases, yet further, the uncertainty in the resultant calculations.

Numerical Instability of Floating Point Calculations

One problem is the inherent instability of the arithmetic due to the ever presence of rounding errors. Indeed, it does not even obey the basic laws of algebra, such as the associative law. That is, if A, B, C are floating point representations of real numbers, then it is not guaranteed that $(A*B)*C = A*(B*C)$. These rounding errors accumulate until the significant digits are corrupted by the rippling round-off errors. Thus, the floating point arithmetic can only be useful for repeated calculations on a limited number of sample points, after which instability sets in.

The numerical stability can be vividly illustrated by following these two sets of (* or +) calculations on the same sequence of real numbers. Each number is expressed in scientific notation, with the significant, buffer and corrupted (or rounded) digits indicated, as described in the previous section.

The first set of calculations is performed on the standard "double" representation. And the second set is performed on the infinite precision representation. The second sequence serves as a genuine benchmark against which the double precision calculations are compared, because it does not have inherent rounding errors.

Both traces start with the same digit, having $s_1$ significant digits and a buffer of $b_1$ digits. The first case already starts with a corrupted digit because of the round-off at its end. The second number does not have a round-off error because of its infinite precision.

Standard type (double) "Infinite" Precision $$0.n_{1j} \ldots n_{sj} \ldots n_{bj} \ldots n_{cj} *10^s \quad 0.n_{1j} \ldots n_{sj} \ldots n_{bj} \ldots *10^s$$
$$*/+ \quad */+,$$
$$*/+ \quad */+,$$
$$0.n_{lk} \ldots n_{sk} \ldots n_{bk} \ldots n_{ck} *10^s \quad 0.n_{lk} \ldots n_{sk} \ldots n_{bk} \ldots *10^s$$

Note at this point, that the buffer digits have become corrupted in the first case.

Subsequent calculations will corrupt the significant digits.

$$0.n_{lr} \ldots n_{sr} \ldots n_{cr} *10^s \quad 0.n_{lr} \ldots n_{sr} \ldots n_{br} \ldots *10^s$$
$$*/+ \quad */+$$
$$*/+ \quad */+$$
$$0.n_{lm} \ldots n_{cm} \ldots *10^s \quad 0.n_{lm} \ldots n_{sm} \ldots n_{bm} \ldots *10^s$$

Note, in the first case, that more digits become corrupted as the number of calculations increase, until the significant digits become meaningless as well. Further, the round-off process typically is not readily quantified for multiple calculations. Therefore, it is not possible to determine how a calculated result compares to its infinite precision counterpart. In a sense, each intermediate result contains the history or memory of its previous calculations through the impact on its buffer bits.

Data Communications Overhead in Microprocessor

There is a second problem with the usual implementations of floating point computer arithmetic, involving the communications costs in moving data in memory to the calculating unit. More specifically, floating point arithmetic implementations generally require the physical movement of data between a computer's main memory, through a cache, then through CPU registers, and then through an Arithmetic Logic unit (ALU) or the more specialized arithmetic unit needed for transcendental function calculations.

Limited-Portability of Floating Point Arithmetic

A third problem is that floating point calculations are performed somewhat differently across multiple computer architectures, notwithstanding the widespread adherence to the IEEE754 standard. As a result, arithmetic operations on the same sequence of real numbers could produce different results on different computer architectures. Therefore, the arithmetic is not completely portable from one computer manufacturer to another. The problem is most acute with transcendental functions.

Description of Known Solutions

Numerical Instability of Standard Floating Point Calculations

Many solutions have been proposed over the years, and several actually used in commercial applications. They generally include, from most to least used:

a. Accept the inherent inaccuracy of floating point calculations. Add buffer bits. Then estimate the number of buffer digits needed to prevent the cumulative rounding errors from corrupting the good, significant digits. For example, one technique is to use the "double" data type for calculations involving "float" data type accuracy. Or the Java language's BigDecimal object is used to conveniently construct numbers with even more digits. Finally, vendors have provided specialized packaging of certain number types like "Money" [Rogue Wave Software Inc., "Money++"], along with an accompanying algebra to perform meaningful and accurate calculations on those data types.

b. Accept the inherent inaccuracy of floating point calculations. Analyze. Then use numerical analysis techniques to quantify error bounds and to provide guidelines on when the calculations become unstable. This technique tends not to be used because the mathematics involved is not well understood or appreciated by users. Even if understood, it can be difficult to implement the analyses. And the quantitative methods could be time consuming and also not proven in effectiveness.

c. Use new models to drive floating point implementations.

This includes "interval analysis". Many such solutions have been proposed over the years, and some actually used in specialized, well controlled, situations.

Data Communications Overhead in CPU

ALU units tend to use embedded tables for efficient computations of more complex transcendental basic arithmetic operations.

Non-Portability of Floating Point Calculations

The IEE754 standard specifies how to handle floating point calculations. It is now adhered to by virtually all computer manufacturers. But there is still enough room for interpretation in these standards that different results can still result from executing the same sequence of numbers on different computer architectures.

An alternate approach is to use constructs in a higher level computer language, to blanket over the differences from one architecture to the next. In particular, the Java language might be used for that purpose.

Deficiencies of Existing "Prior Art"

Numerical Instability of Floating Point Calculations

Numerical instability is still present in industry standard approaches to iterative numeric computations.

Data Communications Overhead in CPU

Even with the use of optimized and tuned embedded CPU components, there is still data movement between memory and CPU. The communications overhead is most pronounced when transcendental calculations are performed.

Non-Portability of Floating Point Calculations

The IEE754 standard has contributed enormously to increasing the portability of floating point computations over many disparate computer architectures. But it still cannot guarantee portability due to flexibility and ambiguity in the interpretation of the standards.

Also, the Java data types still are not as portable as originally intended or expected. An article in EETimes described flaws with Java as a fully portable computation engine.

BRIEF DESCRIPTION OF THE INVENTION

The invention is a signal and noise processor that employs the D Scale, which has previously been disclosed in patent application Ser. No. 09/326,084 now U.S. Pat. No. 6,477,553 in connection with signal and image processing and modeling. The signal processor employs repetitive calculations based on a D Arithmetic has two components. The first is its set of mappings from each pair of points in a D Scale into a point in a D Scale. For example, D Arithmetic multiplication mappings are created by applying the usual, floating point, multiplication to each pair of points in the cross-product of a D Scale with itself. Then each decimal result is mapped to a point in the same D Scale, using the D Scale mapping algorithm described in Ser. No. 09/326,084, which is included herein by reference. Thus, this algorithm generates a set of pre-assigned, or pre-wired, arithmetic operation mappings (e.g., one for multiplication, another for addition). These mappings are generated once, stored in a computer database or its equivalent (e.g. hard wired into a computer chip), and then used forever onwards. This contrasts with the usual notion of arithmetic "calculations" whereby an unknown quantity is discovered for each pair of input values by applying Boolean Algebra to the bits comprising the numeric input values.

The second component is an algorithm to map actual, measured values, into D Scale points. The accuracy and usefulness of the D Arithmetic mappings depends on the precision of the D Scale used. A D Arithmetic that was constructed from a high resolution D Scale can more accurately map sampled data with a high number of significant digits. That is, the result of iterative operations will yield a D Scale value that is within a tighter tolerance of the actual value. The minimum resolution of resolution of a D Arithmetic is determined by the reciprocal of the maximum prime number in the D Scale. However, most important, the average resolution can be orders of magnitude higher because of the irregular pattern of points in a D Scale. A tighter variance e resolution is achieved by using more e sub-scales to fill in the D Scale. It amplifies the effect of far fewer sample points to attain the same mean resolution, with a tight variance, as the naïve, high uniform sampling rate.

The D Arithmetic does not need to use standard Boolean Algebra, which is at the heart of virtually all mainstream commercial arithmetic implementations. Instead, its pre-wired maps embody what standard floating point arithmetic will calculate using Boolean Algebra or whatever operations on a number's bits. Its pre-wired mappings are most readily envisioned as straightforward tables (e.g., multiplication and trigonometric tables). The implementation of these mappings is commercially attractive because of the ever-expanding memory, CPU and bandwidth resources available. Further, the number of mappings in a D Arithmetic implementation can be adjusted to accommodate the required precision of specific applications. This is especially attractive for embedded systems, where resources are husbanded to the fullest, and where it might not be attractive to pay for extra significant digit precision.

See FIG. 1 Hierarchy of Computer Arithmetic Abstractions

The most useful property of the D Arithmetic is its numeric stability, even as the number of calculations on data set values increases. This contrasts sharply with standard floating point arithmetic techniques, whereby accuracy is rapidly lost due to significant digit erosion from cumulative round-off errors, as the number of calculations increases.

A second property is its portability across diverse computer platforms. That is, the same calculations are guaranteed to produce identical results regardless of computer platform used to actually perform the calculations. This also contrasts with the industry standard arithmetic (although the IEEE754 standard appreciably minimized differences across diverse computing platforms).

The third property is its relative efficiency. Its efficiency derives from its use of pre-calculated table values that are accessed in memory or on a networked node. This avoids the communications overhead in moving data between the CPU arithmetic logic unit (ALU) and memory. Again, this contrasts with standard industry practice whereby data must move around to CPU ALU and back for calculated results. Finally, D Arithmetic results' deviations or errors are bounded, quantifiable and readily verifiable.

At the heart of the processing is the industry standard calculation of the Discrete Fourier Transform (DFT) of a signal or image using the full set of sampled data points. Typically, 1 dimensional signal sample data is partitioned into smaller subsets, called periodograms, and then stitched together with the aid of "windowing". And 2 dimensional images are typically partitioned into blocks. Each partition is then used in a DFT calculation to insure that accurate results are still obtainable, before the cumulative round-off overwhelms the original significant digits. For, as the number of data points used in an itterative DFT calculation increases, the likelihood of intermediate calculations being corrupted by round-off errors increases, rendering the final result highly suspicious or completely useless. But this partitioning also has a cost in introducing extra steps to the overall data processing flow. It also requires an extra statistical analysis step to smooth the resulting data. And it introduces artifacts. Indeed, the use of blocks generates visible artifacts in the form of subtle block boundaries across a processed image.

CONTENTS

1. Introduction to the D Arithmetic
2. The D Arithmetic
  2.1 Commercial Feasibility
  2.2 Outline of D Arithmetic Process Flow
  2.3 Mapping Actual Measurements into D Scale Points
  2.4 Random Mapping to Right/Left D Scale Neighbors
  2.5 Construction of Static D Arithmetic Operation Mappings
  2.6 Factoring Scaling into D Arithmetic Mappings
  2.7 Proof of Accuracy and Stability of D Arithmetic Operations
  2.8 D Arithmetic Big Numbers
  2.9 D Arithmetic for Transcendental/Trigonometric Functions
3. Validating the D Arithmetic
4. Sensitivity of D Arithmetic to Random Number Generators
5. Implementing the D Arithmetic
6. Benefits of D Arithmetic/D Scale to Process Noisy Data
7. Commercial Noise Processing Applications of the D Arithmetic/D Scale
8. Other Commercial Applications of the D Arithmetic
10. Example of Construction of a D Arithmetic
11. Examples of D Arithmetic Applications References

BRIEF DESCRIPTION OF THE DRAWINGS

FIG. 2 is a chart of D arithmetic calculation process flow.

FIG. 3 depicts the mapping of a normalized measurement point into a unit D scale.

FIG. 4 depicts the result of multiplying two normalized D scale points.

FIG. 5 depicts the equation for a worst case error.

FIG. 6 depicts the limit of the probability of the error from repeated D arithmetic multiplication exceeding a value.

FIG. 7 depicts the bound on a variance resulting from iterative multiplications.

FIG. 8 depicts a bound on the worst case error from iterative additions.

FIG. 9 depicts the definition of an error $\epsilon_n$.

FIG. 10 depicts a limit of the probability of the error from repeated D arithmetic multiplication exceeding a value.

FIG. 11 depicts a bound on a variance resulting from iterative multiplications.

FIG. 12 depicts a flow chart for noise processing components.

FIG. 13 depicts a D Fourier transform decomposition.

FIG. 14 depicts the list of primes whose subscales comprise a D scale.

FIG. 15 depicts the list of points in a D scale.

FIG. 18 depicts the $20^{th}$ row in a D arithmetic multiplication table.

FIG. 19 depicts the $20^{th}$ row of an order of magnitude corresponding to a cell in a D arithmetic row.

FIG. 21 depicts arrays of actual measurement values and mapped measurement values.

Figure 27C:
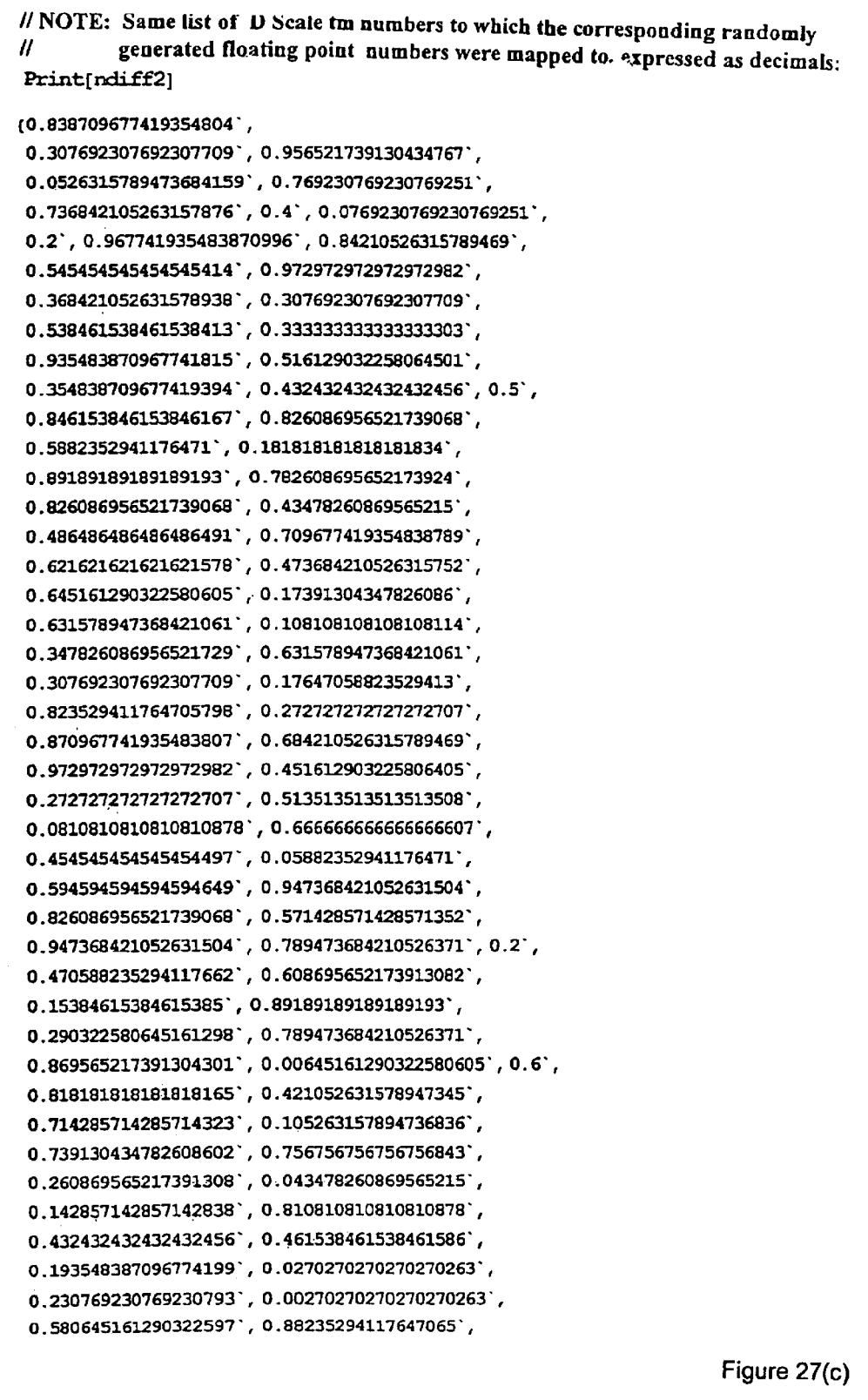

FIGS. 27(a), (b) and (c) of randomly generated floating point numbers used in an example of the present invention.

FIG. 28 is a list of D scale numbers used in an example of the present invention.

Figure 29:
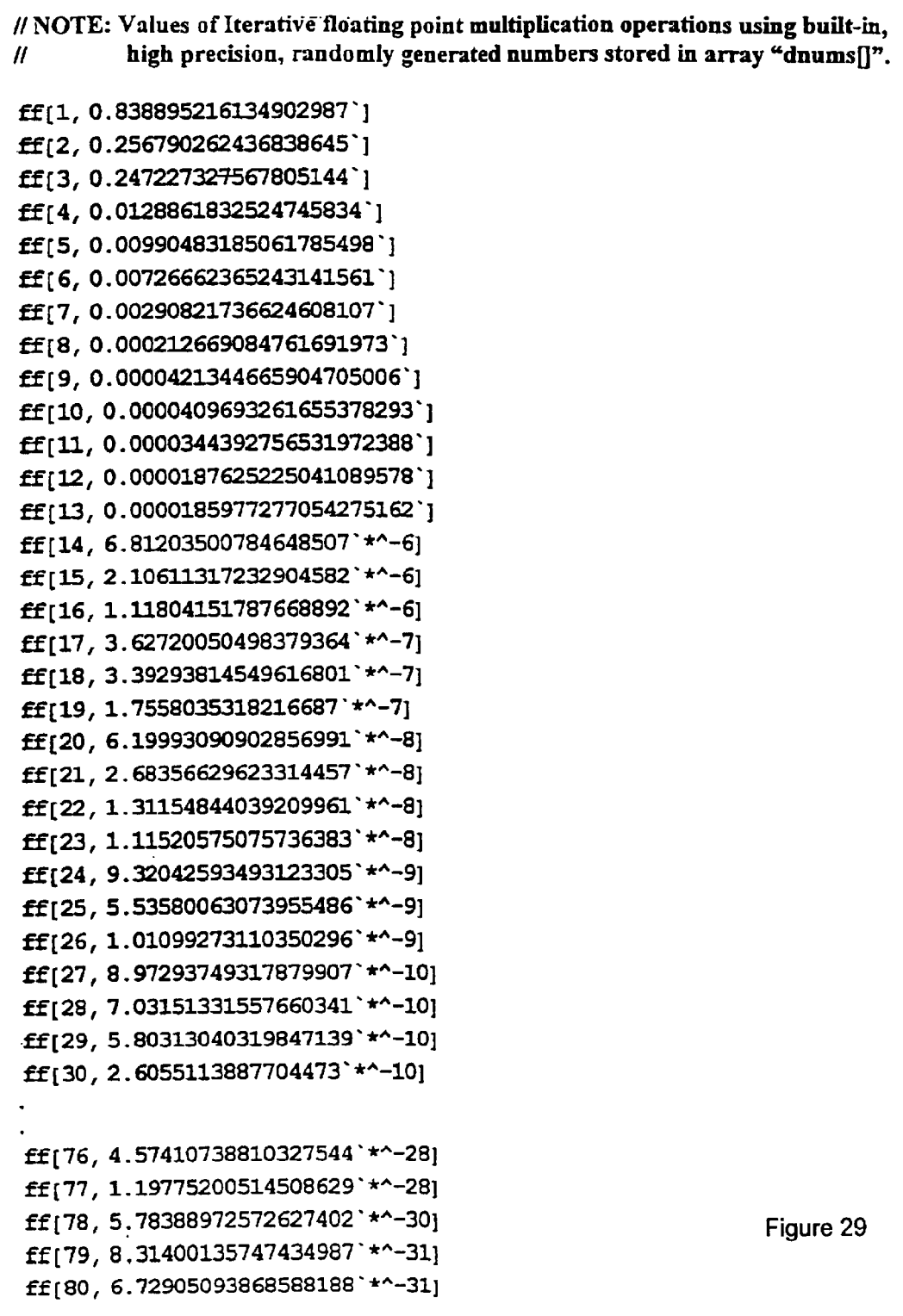

FIG. 29 is a list of values of multiplication operations using randomly generated numbers.

FIG. 30 depicts an algorithm for multiplication operations using D scale mappings.

FIG. 31 is a list of values of multiplication operations using randomly generated numbers.

FIG. 32 is an algorithm for multiplication operations using random numbers rounded to 3 significant digits.

FIGS. 33(a), (b) and (c) are tables of values of iterative multiplications.

DETAILED DESCRIPTION

Figure 1:
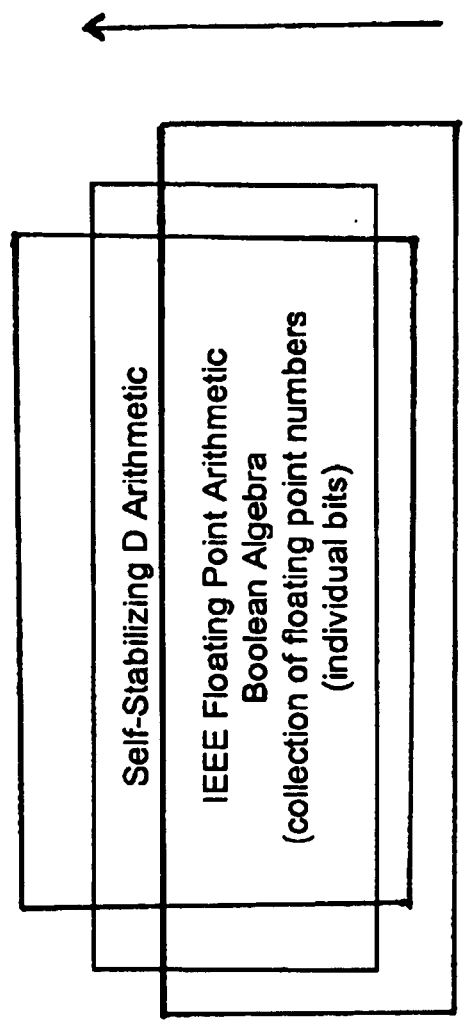
FIG. 1 is a chart depicting the process flow of a set of measured raw data as it is transformed into a result set using the D arithmetic.

The D Arithmetic provides a way for computers to iteratively compute numbers such as in signal processing in a self-stabilizing, efficient and portable manner. That is useful for any data processing involving measured quantities. For example, the D Arithmetic can calculate the Discrete Fourier Transform of a signal's potentially huge set of sample points, without losing stability by the usual erosion of significant digits from round off errors. The present invention involves a novel arithmetic method whereby the results of operations on pairs of numbers is pre-mapped or pre-wired. This pre-wiring automatically insures portability across computing platforms because the mappings are invariant. And these mappings necessarily are efficient because there is no data movement between CPU components to manipulate bits.

1.1 Summary of Internals

The D Arithmetic relies on the properties of the D Scale. This measurement scale is described. Briefly, it relates to a method for sampling physical or simulated data by selecting values at discrete points $x=n/p$, where p is prime and $0<n<p$. The concatenation of the uniformly distributed points, x, associated with each prime p used, constitutes a measurement scale with irregularly spaced points.

The methodology, with its associated algorithms, proceeds by first mapping two arbitrary measured floating point numbers, x and y, into two unique, corresponding points in the measurement scale noted above. The mapping is implemented using an algorithm that can always find a correspondence between a measured point into a unique point on the scale. Those mapped values therefore take the form n/p and n'/p' respectively, where p and p' are primes and members of the measurement scale, and $0<n<p$, $0<n'<p'$. The methodology then provides a logical or physical lookup table mapping for f(n/p, n'/p'). Thus, for the arbitrary values of x and y, one looks up f(n/p, n'/p') where x>>n/p, y>>n'/p' and >> denotes the closet approximate equality within the set of points in the measurement scale, in this case n/p and n'/p'. (The difference between each of the original values x and y, and their corresponding approximated ones, n/p and n'/p', is proved to always be less than or equal to 1/Pmax, where Pmax is the largest prime in the measurement scale used). The methodology requires that the values of f be previously mapped, which they are, in such a way that the result f is still a member of the D Scale. By requiring (or guaranteeing) that f is also an element of the measurement scale, the value of f may be used iteratively in subsequent calculations using the same technique just described. Thus, the set of points in the measurement scale constitutes a closed set with regard to the operation of function f.

The functions f may be simple arithmetic operations, as x+y, x−y, x*y, x/y, or may be transcendental, or a transcendental function of a single variable. F(x,y)=sin x is a simple example.

1.2 Benefits

D Arithmetic provides significant improvements over current computation techniques. In particular, the following commercially attractive properties will be proved:

1.2.1 Probabilistically Bounded, Tolerable, Mapping Errors

This arithmetic will be shown to exhibit probabilistically bounded mapping errors, due to the inherent error cancellations that occur during iterative computations. Note this error is not caused by round-off policy. Rather, it is caused by the mapping of a measured value into a D Scale point. Further, the maximum error bound, which is so improbable as to be virtually impossible to attain, is itself of reasonable size, and tolerable.

1.2.2 Self-Stabilizing Round-off Errors

This arithmetic is self-stabilizing such that round-off errors tend, with very high probability, to cancel one another and not accumulate as in the usual arithmetic. That is, the difference between a D Arithmetic determined value and the exact value will be shown to be bounded in a strong probabilistic sense, with an acceptable tolerance. Further, this tolerance is independent of the number of calculations involved. This behavior stems directly from the D Scale.

1.2.3 Portability

This arithmetic is fully portable across computer architectures, because it relies on pre-defined D Scale mappings. These mappings are invariant and independent of computing platforms or architectures.

1.2.4 Efficiency

This D Arithmetic is fast, especially for transcendental and trigonometric function calculations. Its efficiency stems from its use of pre-defined, or pre-wired mappings. There is no need for (relatively) time consuming data communications within a microprocessor, between memory, cache, registers and arithmetic logic units (ALU).

1.2.5 Quantifiable Error Tolerance

The exact error resulting from multiple calculations can also be calculated. Thus, not only is the error guaranteed to be bounded, but it can be determined as well. That is not the case with the usual floating point arithmetic.

2. The D Arithmetic

The D Arithmetic uses a pre-defined set of mappings. Each mapping defines the "calculated" result when an arithmetic operation is performed on a pair of real numbers. The arithmetic operation might be multiplication, addition, subtraction or division or trigonometric operations like sine and cosine. However, using unconstrained pre-defined mappings would be theoretically, and therefore practically unfeasible because of the uncountable number of mappings required. The feasibility of the D Arithmetic mapping stems directly from its use of D Scale points. That is, a finite, yet manageable, set of mappings are defined between pairs of points in the D Scale into results from the same set of points. For example:

$x*y \to z$ where x,y,z are points in a D Scale

The pre-defined arithmetic mappings have the logical structure of a two dimensional table, one table per arithmetic operation. A table's cell then contains the result of the mapping, or the intersection of the two coordinate numbers in a pair, where all cell and coordinate numbers are from a D Scale. Therefore, the D Arithmetic does not actually "calculate" results. Rather, it effectively behaves like a routing table, directing a pair of originating values to a destination value.

The logical tables can be implemented in several ways. The mappings can be in an in-memory table, a file, database tables, or distributed over a network of like objects. Or the mappings can be dynamically calculated as needed.

2.1 Commercial Feasibility

The invention's practical feasibility stems from the ongoing mega-trends in increasing capacity vs. decreasing price for CPU memory, disk storage and communications bandwidth.

2.1.1 Memory Capacity/Price

CPU memory capacity is ever increasing, along with falling prices, to the extent that 250 Mbytes of memory is well within the capability of a basic PC today, and 500 Mbyte–1 Gbyte is well within the capability of a small server.

The D Arithmetic leverages off of the increased main memory available at ever lower prices, to perform calculations without data movement in the microprocessor. Actually, the term "calculation" is a misnomer in this context. For, a result is obtained by following memory references of the inputs to their mapped result. Consider a D Arithmetic that is generated from a D Scale with 1000 points through the union of the D Scale's prime sub-scales. This D Scale's resolution might have an average resolution of 6 significant digits. This multiplication table would then consume 10002 table cells, if the D Arithmetic multiplication mappings were implemented in one CPU's memory. If each cell consumed on the order of 10 bytes for the result and order-of-magnitude values, then about 10 Mbytes would be consumed by this multiplication table. This resource consumption is well within the capability of a plain PC. Or consider a D table built from a D Scale of 10000 points, with an average resolution of 8 significant digits. It would consume 1 Gbyte of memory. This is clearly out of range of current plan stand-alone PCs. But the multiplication table can readily be implemented on a small server. Thus, as the number of significant digits required of a D Arithmetic increases, the memory required to implement the arithmetic table increases such that implementations are forced up the line from stand-alone PC to small server to large server. That is, each additional significant digit costs in terms of computing platform to implement the D Arithmetic mappings. But the costs are well within current capabilities and will improve substantially over time. Yet measurement instruments on average might still be required to yield anywhere from 5–20 significant digits.

2.1.2 Memory Mapped I/O

Continuing the reasoning from the previous section, consider that a multiplication table might easily requires 100 Gbytes for an average resolution of 15 digits. This is beyond the capacity of small servers. But it can be implemented using the standard operating system virtual memory management technique of memory mapped IO. This technique enables the table to reside on a 100 Gbyte file, yet appear as internal memory when used by the D Arithmetic processing. This storage requirement is well within the capability of a moderately sized server. Memory mapped IO capacity also continues to improve along with ever increasing storage capacity.

2.1.3 Bandwidth Capacity/Cost

Continuing again the reasoning from the previous section, consider that a multiplication table might require 1,000 TeraByte ($10^{15}$) to support an average resolution of 20 digits. This is beyond the memory mapped IO of typical servers today. But the ever increasing bandwidth capability enables the D Arithmetic implementation to extend over a set of PCs or servers. Each computer would contain a subset of the full D Arithmetic mappings. They could be interconnected as a binary tree of nodes using standard techniques. The particular table used would be determined by the pair value to be mapped, using their values as an address to the computer in the tree that contains their result.

2.2 Outline of D Arithmetic Computing Flow

FIG. 2 below depicts the computation process flow of a set of measured, raw, data as it is transformed into a result set, using the D Arithmetic.

A raw data set is first created from the actual measurements of a process.

Each raw data point is the then mapped to one of its to nearest points on the D Scale used. The mapping into either left or right neighbors is determined by a random coin toss. Then the D Arithmetic points that correspond to the original measurements are iteratively computed for an arithmetic or trigonometric operation. Each step of this computation is just a mapping or memory reference operation, without data movement.

The result of the iterative computations is then a D Scale point. The actual result is shown to be within a small and acceptable neighborhood of this D Scale result.

Each of these steps is detailed in the following sections.

2.3 Mapping Actual Measurements into D Scale Points

Let x be a normalized measurement point. That is:

$$x = 0.n_1 \ldots n_s \ldots n_b \ldots n_c * 10^s$$

where s is an integer corresponding to the order-of-magnitude of this measurement. $n_i$ are decimal digits 0–9 that are significant as actual measured values.

That point will then reside somewhere in a D Scale unit interval, as shown in FIG. 3 below. As a direct consequence of the D Scale, x must necessarily reside in the inclusive interval of two scale points, denoted $n_j/p_k$ and $n_j/p_l$, where:

$n_j/p_k$ is the i-th point on the unit prime subscale $P_l$.

$n_j/p_l$ is the j-th point on the unit prime subscale $p_l$.

These points can be determined using the D Scale measurement sampling algorithm. Therefore:

$$x = n_j/p_k + (\delta_{x,ik}\Delta_{ik,jl}) \text{ where } 0 <= \delta_{x,jl} <= 1$$

Or:

$$x = n_j/p_l - (\delta_{x,jl}\Delta_{ik,jl}) \text{ where } 0 <= \delta_{x,bn} <= 1$$

and $\Delta_{ik,jl}$ is the distance between these two D Scale points.

The next step is to decide which of the neighboring scale points to map x into. That is:

$$x \rightarrow n_j/p_k * 10^s \text{ where } 0 < n_j \leq p_k$$

Or:

$$x \rightarrow n_j/p_l * 10^s \text{ where } 0 < n_j \leq p_l$$

2.4 Random Mappings to Right/Left D Scale Neighbors

The straightforward approach is to map normalized point x to the nearest of its two neighbors. Instead, an element of randomness is introduced at this juncture to insure that the arithmetic will be self-stabilizing. The effect of randomness is to prevent any accumulated bias towards one direction of accumulating mapping errors. Thus, each mapping is based on the outcome of a pseudo-random 0/1 bit number generator (i.e., a coin toss). The point's left neighbor is assigned for a 0 outcome, or the right neighbor for a 1 outcome, or vice-versa as long as applied consistently. It will be shown that the quality of the random number generator does not need to be optimal.

Construction of Static D Arithmetic Operation Mappings

An algorithm is presented to generate a static set of mappings between pairs of D Scale numbers into D Scale numbers. Each mapping type corresponds to a different arithmetic operation: multiplication, addition, division, subtraction. The algorithm is described for multiplication. The other arithmetic operations use the same procedures.

2.5.1 Multiplication

The multiplication mapping between any two normalized D Scale points, $n_i/p_k$ and $n_j/p_l$, is determined as follows:

Let $n_i/p_k$ represent the i-th normalized point on the k-th prime sub-scale of a D Scale Let $n_j/p_l$ represent the j-th normalized point on the l-th prime sub-scale of the same D Scale. Then:

$$n_a/p_m \rightarrow n_i/p_k * n_j/p_l$$

$n_a/p_m$ is the a-th point on the m-th prime sub-scale of the same D Scale.

$n_a/p_m$ is obtained by mapping the actual multiplied value of $n_i/p_k * n_j/p_l$ to the nearest of its two neighboring D Scale points, $n_a/p_m$ and some $n_n/p_n$.

na/pm is obtained by a two step procedure. First, it must be normalized to include the appropriate number of leading zeros. The appropriate number is set to either the maximum number of leading zeros over all of the D Scale fractions, if there are more than that number of leading zeros in the multiplied decimal value. Or, it is set to the actual number of leading zeros if it is less than the maximum number of leading zeros, the by mapping the actual multiplied value of $n_i/p_k * n_j/p_l$ to the nearest of its two neighboring D Scale points, $n_k/p_m$ and $n_n/p_n$.

It is an open issue whether additional randomness is needed in the mapping of a pair of D Scale points to another point. The randomness of the D Scale mappings of measurement points should implicitly provide enough randomness. But if additional randomness is desired, then the multiplied D Scale value could be obtained by randomly mapping the actual multiplied value of ni/pk*nj/pl to one of its two nearest D Scale points, nk/pm and nn/pn.

Consider the example depicted in FIG. 4 below. Let x represent the actual value of $n_i/p_k * n_j/p_l$. Then:

$$x = n_a/p_m + (\delta_{x,am}\Delta_{am,bn}) \text{ where } \frac{1}{2} <= \delta_{x,am} <= 1$$

Or $$x = n_b/p_n - (\delta_{x,bn}\Delta_{am,bn}) \text{ where } 0 <= \delta_{x,bn} <= \frac{1}{2}$$

The rule, again, is to pick the nearest D Scale point neighbor. Therefore the mapping is:

$$n_i/p_k * n_j/p_l \rightarrow n_b/p_n$$

$$\Delta_{ik,jl} <= 1/p_{max}$$

2.6 Factoring Scaling into D Arithmetic Mappings

Each arithmetic (e.g., multiplication) mapping of a pair of normalized points in the D Scale yields a point in the D Scale. The mapped point is normalized following the procedure described in the previous section. Therefore it is saved as two values, its normalized decimal fraction and its power-of-ten order-of-magnitude. Its full value (fraction times its orders-of-magnitude) is used with other D Scale points to generate yet other mappings with co-pairs.

2.7 Proof of Accuracy and Self-Stability of the D Arithmetic

The D Arithmetic is proven to be accurate and correct. The proof is based on comparisons between intermediate and final results of D Arithmetic mappings against corresponding calculations using the benchmark "infinite" precision numbers. Further, these results are also contrasted to corresponding results from using the finite precision of built-in "double" or "double precision" types.

2.7.1 Multiplication Operation

The following two theorems are proved. The first quantifies the theoretical worst case mapping error from iterative multiplication operations. And it also demonstrates that that worst case scenario is so highly unlikely as to be impossible to achieve. The second theorem quantifies the realistic error from the iterative multiplication mappings. It demonstrates that self-stabilization is at work to counteract any tendency for the mapping errors to accumulate during iterative calculations. This mapping error distribution is similar to a Bernoulli distribution, which quantifies the probability of a certain number of heads or tails in a sequence of random coin tosses. Corresponding to a head is a random mapping to the left nearest neighbor, and tail to the mapping to the right nearest neighbor. And each sequential trial corresponds to an iterative, intermediate, mapping along the way to the result.

Proof of Theorem 1:

Mathematical induction will be applied on the number of floating point numbers used in a series of serial calculations. That is, the assertion in Theorem 1 must be proved to be true for the first case, where n=3. Then, assuming that the assertion is true for the n-the case, the =assertion must be proven for the (n+1)-st case.

Case 1: $x_1*x_2$

Theorem:

If $x_3=x_1*x_2$ then $x_3=n/p \pm \epsilon_3$ and $\epsilon_3 =< 1/p_{max}$ where n/p is some point on the D Scale Proof:

Consider the mappings of any two measurement points $x_1$ and $x_2$ into their respective D Scale points, $n_1/p_k$ and $n_2/p_l$ (This mapping was described in section 3.3). That is, the measurement points' floating point values are mapped into D Scale fractions as:

$x_1 = 0.n_1 \ldots n_s \ldots n_b \ldots n_c * 10^{s1} \rightarrow n_1/p_k * 10^{s1}$ where $0 < n_1 < p_k$ $x_2 = 0.m_1 \ldots m_s \ldots m_b \ldots m_c * 10^{s2} \rightarrow n_2/p_l * 10^{s2}$ where $0 < n_2 < p_l$ Then, still following the discussion in Section 3.3, the corresponding measurements and D Scale points are related as follows:

$x_1 = (n_1/p_k \pm (\delta_{x,1k} \Delta_{1k,i1j1}))$ $x_2 = (n_2/p_l \pm (\delta_{x,2l} \Delta_{2l,i2j2}))$ where:

$\Delta_{1k,i1j1}$ is the distance between the two nearest D Scale neighbors of $x_1$;

$n_1/p_k$ and its more distant neighbor, some D Scale point $n_{i1}/p_{j1}$, $\delta_{x,1k}$ is the fraction of the interval $\Delta_{1k,i1j1}$ between x and $n_1/p_k$ Similarly:

$\Delta_{2k,i2j2}$ is the distance between the two nearest D Scale neighbors of $x_2$, $n2/p_k$ and its more distant neighbor, some D Scale point $n_{i2}/p_{j2}$, $\delta_{x,2l}$ is the fraction of the interval $\Delta_{2l,i2j2}$ between x and $n_2/p_l$ And:

$0 <= \delta_{x,1k} <= \frac{1}{2}$ $0 <= \delta_{x,2l} <= \frac{1}{2}$ for otherwise, x would not be associated with the scale point above, but rather the other neighbor.

Consider the multiplication operation on the two measurements using "infinite" precision arithmetic calculations. Recall that it is one of the three approaches used to compare accuracy of results; D Arithmetic mappings standard precision arithmetic and "infinite" precision arithmetic calculations.

Results from the other two approaches can be readily determined from this trace.

"Infinite" Precision Calculation:

$y_3 = x_1 * x_2 = ($ $n_1/p_k \pm (\delta_{x1,1k} \Delta_{1k,i1j1})) * (n_2/p_l \pm (\delta$ $x2,2l\Delta_{2l,i2j2})) = (n_1/p_k * n_2/p_l) \pm ((${

$n_1/p_k * (\delta_{x2,2l} \Delta_{2l,i2j2})) \pm (n_2/p_l * (\delta$ $x1,1k\Delta_{1k,i1j1}))) \pm ((\delta$ $x1,1k\Delta_{1k,i1j1}) * (\delta_{x2,2l} \Delta_{2l,i2j2}))$ Consider the relevant D Arithmetic mapping of the first term in the multiplication above, as follows:

If the decimal result from multiplying the first two D Scale points is:

$x_v = n_1/p_k * n_2/p_l$ then, by applying the methodology in section 3, $x_v$ can always be mapped into some point on the scale:

$x_v \rightarrow n_{y3}/p_{m3}$

Therefore from Section 3.5:

$n_{y3}/p_{m3} = x_v \pm (\delta$ xv,y3m$*\Delta_{y3m,iy3jy3}$) $0 <= \delta_{xv,y3m} <= \frac{1}{2}$ Or, $n_{y3}/p_{m3} = (n_1/p_k * n_2/p_l) \pm (\delta$ xv,y3m$\Delta_{y3m,iy3jy3}$) $0 <= \delta_{xv,y3m} <= \frac{1}{2}$ where:

$\Delta_{y3m,iy3jy3}$ is the distance between the two nearest D Scale neighbors of $x_v$, $n_{y3}/p_{m3}$ and its more distant neighbor, some D Scale point $n_{iy3}/p_{jy3}$, $\delta_{xv,y3m}$ is the fraction of the interval $\Delta_{3m,iy3jy3}$ between $x_v$ and $n_{y3}/p_m$ Substituting this for its corresponding term in the expression for $y_3$ above leads to:

$y_3 = x * x_2 = n_{y3}/p_{m3} \pm (\delta_{xv,y3m} * \Delta_{y3m,iy3jy3}) \pm ((${

$n_1/p_k * (\delta_{x,2l}\Delta_{2l,i2j2})) \pm (n_2/p_l * (\delta$ $x,1k\Delta_{1k,i1j1}))) \pm ((\delta_{x,1k}\Delta_{1k,i1j1}) * (\delta_{x,21}\Delta_{21,i2j2}))$ Or:

$y_3 = n_{y3}/p_{m3} \pm \epsilon_3$ where:

$\epsilon_3 = (\delta_{xv,y3m} * \Delta_{y3m,iy3jy3}) \pm (($ $n_1/p_k * (\delta_{x,21}\Delta_{21,i2j2})) \pm ($ $n_2/p_l * (\delta_{x,1k}\Delta_{1k,i1j1}))) \pm ((\delta$ $x,1k\Delta_{1k,i1j1}) * (\delta_{x,2l}\Delta_{2l,i2j2}))$ This equation indicates that the infinite precision, "true", calculation is equal to the D Arithmetic mapping $n_{y3}/p_{m3}$ plus or minus a relatively small amount $_{68\ 3}$.

It is now proved that:

$\epsilon_3 =< \frac{1}{2}/p_{max} + \frac{1}{2}/p$ max+$\frac{1}{4}/p^2_{max}$

That will thereby satisfy the first requirement of mathematical induction, that the initial case of the general claim is true.

a. Consider each of the terms above:

$(\delta_{xv,y3m} * \Delta_{y3m,iy3jy3}) =< \frac{1}{2}\Delta$ y3m,iy3jy3 $=< \frac{1}{2}/p_{max}$ Because:

$0 =< \delta_{xv,y3m} =< \frac{1}{2}$ and $\Delta_{y3m,iy3jy3} =< 1/p_{max}$ as a D Scale property $(n_1/p_k*(\delta_{x,2l}\Delta_{2l,i2j2})) < ($ $p_{max}^{-1}/p_{max})\frac{1}{2}\Delta$ $2l,i2j2) = < (p_{max}^{-1}/p_{max})\frac{1}{2}/p_{max}$ Because:

$n_1/p_k = < (p_{max}^{-1})/p_{max} \forall k n_1 < p_k$ and $p_k = < p_{max}$ by D Scale properties $\delta_{x,2l}\Delta_{2l,i2j2} < \frac{1}{2}\Delta$ $2l,i2j2 < \frac{1}{2}/p_{max}$ $\Delta_{2l,i2j2}$ is the distance between two adjacent D Scale points, which must be $=<1/p_{max}$.
Also, $0 = <\delta_{x,2l} = <\frac{1}{2}$
Similarly:

$(n_2/p_l*(\delta_{x,1k}\Delta_{1k,i1j1})) < (p_{max}^{-1}/p$ $max)\frac{1}{2}\Delta_{1k,i1j1}) = < (p$ $max^{-1}/p_{max})\frac{1}{2}/p_{max}$ where $0 = <\delta_{x,1k} = <\frac{1}{2}$ $((\delta_{x,1k}\Delta_{1k,i1j1})*(\delta_{x,2l}\Delta_{2l,i2j2})) = <$ $\frac{1}{2}\Delta_{1k,i1j1}*\frac{1}{2}\Delta_{2l,i2j2}$ $= <\frac{1}{4}(1/p_{max})(1/p_{max}) <$ $\frac{1}{4}/p_{max}^2$ b. Next, consider the worst case where the components are all additive. Then the worst case sum is:

WorstCaseSum $\epsilon_3 = <\frac{1}{2}/p_{max}+($ $p_{max}^{-1}/p_{max})\frac{1}{2}/p_{max}+($ $p_{max}^{-1}/p_{max})\frac{1}{2}/p$ $max+\frac{1}{4}/p^2_{max}$ $=\frac{1}{2}/p_{max}+\frac{1}{2}($ $p_{max}^{-1})/p^2_{max}+\frac{1}{4}/p^2_{max}$ After collecting these terms:

WorstCaseSum $\epsilon_3 = \frac{1}{2}/p_{max}+\frac{1}{2}/p$ $max-\frac{1}{2}/p^2_{max}+\frac{1}{4}/p^2_{max}$ $=1/p_{max}+\frac{1}{4}/p^2_{max}$ $<\frac{1}{2}/p_{max}+\frac{1}{2}/p$ $max+\frac{1}{4}/p^2_{max}$ Therefore:

$\epsilon_3 = <1/p_{max}+\frac{1}{4}/p^2_{max}$

The same worst case reasoning can be applied when all the components are subtractive, to yield:

$\epsilon_3 = <1/p_{max}-\frac{1}{4}/p^2_{max}$

Case 2.
Consider the result of iteratively multiplying three floating point numbers:

$y_4 = x_1 * x_2 * x_3$ $= y_3 * x_3$ where $x_3$ is the third measurement point's floating point value:
$x_3 = 0.m_1 \ldots m_s \ldots m_b \ldots m_c * 10^s \rightarrow n_3/p_l * 10^{s3}$ where $0 < n_3 < p_l$ Then, again as discussed in section 3.3, the corresponding measurement and D Scale points are related as follows:

$x_3 = (n_3/p_{k3} \pm (\delta_{x,3k}\Delta_{3k,i3j3}))$ where:
$\Delta_{3k,i3j3}$ is the distance between the two nearest D Scale neighbors of $x_3$,
$n_3/p_{k3}$ and its more distant neighbor, some scale point $n_{i3}/p_{j3}$,
$\delta_{x,3k}$ is the fraction of the interval $\Delta_{3k,i3j3}$ between x and $n_3/p_k$
$0 = <\delta_{x,3k} = <\frac{1}{2}$
But, from Case 1 in the previous section:

$y_3 = n_{y3}/p_{m3} \pm \epsilon_3$ where:

$\epsilon_3 = (\delta_{xv,yy3m}*\Delta_{y3m,iy3jy3}) \pm ((\,$ $n_1/p_k*(\delta_{x,2l}\Delta_{2l,i2j2})) \pm (n_2/p$ $l*(\delta_{x,1k}\Delta_{1k,i1j1}))) \pm ((\delta$ $x,1k\Delta_{1k,i1j1})*(\delta_{x,2l}\Delta_{2l,i2j2}))$ and:

$\epsilon_3 = <1/p_{max} \pm \frac{1}{4}/p^2_{max}$

Therefore:

$y_4 = (n_{y3}/p_{m3} \pm \epsilon_3)*($ $n_3/p_{k3} \pm (\delta_{x,3k}\Delta_{3k,i3j3})) = ($ $n_{y3}/p_{m3}*n_3/p_{k3}) \pm ((\,$ $n_{y3}/p_m*(\delta_{x,3k}\Delta_{3k,i3j3})) \pm ($ $n_3/p_k*\epsilon_3) \pm (\epsilon_3)*(\delta$ $x3,3k\Delta_{3k,i3j3}))$ Or:

$y_4 = n_{y4}/p_{m4} \pm \epsilon_4$ where:

$x_v = (n_{y3}/p_{m3}*n_3/p_{k3})$ then, by applying the methodology in section 3, $x_v$ can always be mapped into some point on the scale:

$x_v \rightarrow n_{y4}/p_{m4}$

Therefore from Section 3.5:

$n_{y4}/p_{m4} = x_v \pm (\delta_{xv,y4m}*\Delta$ y4m,iy4jy4) $0 = <\delta_{xv,y4m} = <\frac{1}{2}$ And:

$\epsilon_4 = (\delta_{xv,y4m}*\Delta_{y4m,iy4jy4}) \pm ((\,$ $n_{y3}/p_{m3}*(\delta_{x,3k}\Delta_{3k,i3j3}))\pm($ $n_3/p_{k3}*\epsilon_3)\pm(\epsilon$ $3)*(\delta_{x3,3k}\Delta_{3k,i3j3}))$ This equation indicates that the infinite precision, "true", calculation is equal to the D Arithmetic mapping, $n_{y4}/p_{m4}$ plus or minus a relatively small amount $\epsilon_4$.

It is now proved that:

$\epsilon_4 = <\frac{1}{2}/p_{max} + 2(\frac{1}{2}/p$ $max) + \frac{1}{4}/p^2_{max} + \frac{1}{4}/p^3_{max}$ That will thereby satisfy the first requirement of mathematical induction, that the initial case of the general claim is true.

a. Consider each of the terms above:

$(\delta_{xv,y4m}*\Delta_{y4m,iy3jy3}) = <\frac{1}{2}\Delta$ $y4m,iy4jy4 = <\frac{1}{2}/p_{max}$ Because:

$0 = <\delta_{xv,y4m} = <\frac{1}{2}$ and $\Delta_{y4m,iy4jy4} = <1/p_{max}$ as a D Scale property $(n_{y3}/p_{m3}*(\delta_{x,3k}\Delta_{3k,i3j3})) < ($ $p_{max}^{-1}/p_{max})\frac{1}{2}\Delta_{3k,i3j3}) = <(p_{max}^{-1}/p_{max})\frac{1}{2}/p_{max}$ Because:

$n_{y3}/p_{m3} = <(p_{max}^{-1})/p_{max} \forall kn$ $y3 < p_k$ and $p_k = <p_{max}$ by D Scale properties Similarly:

$(n_3/p_{k3}*\epsilon_3) = <(p_{max}^{-1}/p_{max})(1/p_{max} \pm \frac{1}{4}/p^2_{max})$ $= <1/p_{max} - 1/p^2_{max} \pm \frac{1}{4}/p^2_{max} \pm \frac{1}{4}/p^3_{max}$ $(\epsilon_3)*(\delta_{x3,3k}\Delta_{3k,i3j3})) = <(1/p_{max} - \frac{1}{4}/p^2_{max})\frac{1}{2}\Delta$ $3k,i3j3 = <\frac{1}{2}(1/p_{max}^2) - \frac{1}{8}(1/p_{max}^3)$ b. Next, consider the worst case where the components are all additive. Then the worst case sum is:

WorstCaseSum $\epsilon_4 = <\frac{1}{2}/p_{max} + ($ $p_{max}^{-1}/p_{max})\frac{1}{2}/p_{max} + 1/p$ $max - 1/p^2_{max} \pm \frac{1}{4}/p^2$ $max \pm \frac{1}{4}/p^3_{max} + \frac{1}{2}($ $1/p_{max}^2) - \frac{1}{8}(1/p_{max}^3)$ WorstCaseSum $\epsilon_4 = <2/p_{max} \pm \frac{1}{4} 1/p^2_{max} \pm \frac{1}{8} 1/p^3_{max}$ The same sort of worst case reasoning can be applied when all the components are subtractive.

2. Case n-Let $x_n$ result from multiplying (n–1) floating point numbers. Or:

$$y_n = \prod_1^n x_i$$

then, by mathematical induction, assume that the following is true:

$y_n = n_{yn}/p_{mn} \pm \epsilon_n$ where $n_{yn}/p_{mn}$ is a point in the D Scale and:

$$\varepsilon_n = <(n-1)/p_{max} \pm \sum_{k=2}^{k=n} a_k / p_{max}^k$$

3. Case (n+1)

Let x be a floating point number. The result of multiplying n floating point numbers is identically the result of multiplying $x_n$ and $y_n$ from case n above. Or:

$y_{n+1} = y_n * x_n$ where $x_n$ is the third measurement point's floating point value:

$x_n = 0.m_1 \ldots m_s \ldots m_b \ldots m_c * 10^{s2} \to n_n/p_l * 10^{s3}$ where $0 < n_n < p_l$ Then, again as discussed in section 3.3, the corresponding measurement and D Scale points are related as follows:

$x_n = (n_n/p_{kn} \pm (\delta_{x,nk}\Delta_{3k,injn})$

Need to prove that:

$y_{n+1} = n_{yn+1}/p_{mn+1} \pm \epsilon_{n+1}$ where $n_{yn+1}/p_{mn+1}$ is a point in the D Scale and:

$$\varepsilon_{n+1} = <((n+1)-1)/p_{max} \pm \sum_{k=2}^{k=n+1} a_k / p_{max}^k$$

Proof:

The details are identical to the case n=3.

2.7.2 Probabilistic vs. Worst Case Multiplication Error—Theorem #2

Recall that a measurement point is mapped to a D Scale point using a nearest neighbor criteria. That is, first, the two neighbors that bound the measurement are identified. Then the nearest of these neighbors is selected as the measurement point's proxy. The worst case multiplication error derived in the previous section, would occur if each measurement point's mapped D Scale point were biased in the same direction. That is, each corresponding D Scale point would be consistently less, or greater, than the actual measurement.

A simple procedure can insure far lower error tolerance, even as more numbers are iteratively multiplied. Indeed, this procedure is at the heart of this arithmetic's self-stabilizing property. The procedure is to randomly select either of the identified left or right D Scale neighbors of a measurement point, with equal, uniform, probability. Then, the probability that a set of k out of n measurement points is biased towards its left or rightmost D Scale points, is governed by the Bernoulli distribution of random coin tosses. Or, Let p=Probability{heads}=½
q=Probability{tails}=½
Probability{k heads in n tosses}=$(n)p^k q^{(n-k)}(k)$
=$(n)½^k ½^{(n-k)}(k)$ This distribution quantifies the intuitive notion that cumulative biases between measurement and D Scale points tend to zero, because of net cancellations from random selections of D Scale neighbors. The central theorem underlying the D Arithmetic self-stabilizing property is a direct consequence of the Bernoulli probability distribution. That is, a consequence of the DeMoivre-Laplace theorem is that:

Probability{|Expected Value{random tosses variable}$-p$|$<\epsilon$}$\to 1$ as $n\to\infty$ This is equivalent to:
Probability($\epsilon_n > 1/p_{max}$)$\to 0$ as $n \to \infty$
decreasing rapidly at the rate of $½^n$

2.7.3 Addition Operation

The following theorems are proved. The first quantifies the theoretical worst case mapping error. But it also indicates that that worst case scenario is so highly unlikely as to be impossible to achieve. The second theorem quantifies the realistic error from the iterative addition mappings. It demonstrates that self-stabilization is at work to counteract any tendency for the mapping errors to accumulate during iterative mappings (or "calculations"). The third theorem quantifies the variance of the error distribution. This mapping error distribution is similar to a Bernoulli distribution, which quantifies the probability of a certain number of heads or tails in a sequence of random coin tosses. Corresponding to a head is a random mapping to the left nearest neighbor, and tail to the mapping to the right nearest neighbor. And each sequential trial corresponds to an iterative, intermediate, mapping along the way to the result.

Reasoning analogous to proving the D Arithmetic multiplication properties is applied to prove its addition properties. That is, each measurement is mapped in a corresponding D Scale point. The calculations are summarized, with details inferred from the multiplication case.

Case 1:
Let $x_1$ and $x_2$ be measurement points whose "infinite" precision addition result is $y_3$:

$y_3 = x_1 + x_2$

Let the measurements' corresponding D Scale points be:

$x_1 \to n_1/p_1 \pm (\delta_{x1,1k} \Delta_{1k,i1j1})$ $x_2 \to n_2/p_2 \pm (\delta_{x2,2l} \Delta_{2l,i2j2})$ Then:

$y_3 = (n_1/p_1 \pm (\delta_{x1,1k}\Delta_{1k,i1j1})) + ($ $n_2/p_2 \pm (\delta_{x2,2l}\Delta_{2l,i2j2}))$ $= (n_1/p_1 + n_2/p_2) \pm (\delta_{x1,1k}\Delta$ $1k,i1j1) \pm (\delta_{x2,2l}\Delta_{2l,i2j2})$ $= n_3/p_3 \pm (\delta_{x3,l3}\Delta_{l3,i3j3}) \pm (\delta$ $x1,1k\Delta_{1k,i1j1}) \pm (\delta_{x2,2l}\Delta_{2l,i2j2})$ That is, the true value is related to the D Arithmetic mapping by:

ExactSum=D Arithmetic mapping$\pm \epsilon_3$ or:

$y_3 = n_3/p_3 \pm (\delta_{x3,l3}\Delta_{l3,i3j3}) \pm (\delta$ $x1,1k\Delta_{i1j1}) \pm (\delta_{x2,2l}\Delta_{2l,i2j2})$ where:

$\epsilon_3 = (\delta_{x3,l3}\Delta_{l3,i3j3}) \pm (\delta_{x1,1k}\Delta$ $i1j1) \pm (\delta_{x2,2l}\Delta_{2l,i2j2})$ After substituting the various inequalities for the delta terms:

$\epsilon_3 = <\pm ½/p$ $max \pm ½/p_{max} \pm ½/p_{max}$

The worst case error occurs when the D Scale biases are all greater than or less than the actual measurement points. Then:

Prob($y_3 = n_3/p_3 + ½/p$ $max + ½/p_{max} + ½/p$ $max) = (½)^3$

Prob($y_3 = n_3/p_3 - ½/p$ $max - ½/p_{max} - ½/p$ $max)) = (½)^3$

Case n:

$$y_k = \sum_{i=0}^{k-1} x_i$$

$$= \sum_{i=0}^{k-1} (n_i/p_i \pm (\delta_{x1,lk}\Delta_{lk,ilj1}))$$

$$= \sum_{i=0}^{k-1} (n_i/p_i) \pm \sum_{i=0}^{k-1} (\delta_{x1,lk}\Delta_{lk,ilj1})$$

Therefore:

ExactSum=D Arithmetic mapping$\pm \epsilon_n$ $$y_k = \sum_{i=0}^{k-1} (n_i/p_i) \pm \sum_{i=0}^{k-1} 1/p_{max}$$

$$\epsilon_n = <\sum_{i=0}^{k-1} 1/p_{max}$$

As with multiplication, the error tolerance can be substantially reduced by random mapping of a measurement point to either of its nearest D Scale neighbors. Then each mapping becomes a Bernoulli trial, leading to a probabilistic error that actually decreases as more numbers are iteratively added. That is, Probability{|Expected Value{random tosses variable}$-p$|$<\epsilon$}$\to 1$ as $n\to\infty$ This is equivalent to:
Probability($\epsilon_n > 1/p_{max}$)$\to 0$ as $n \to \infty$
decreasing rapidly at the rate of $½^n$

2.8 D Arithmetic on Big Numbers

The number of D Arithmetic mappings that can be implemented is necessarily limited. Limitations occur because of physical constraints of the computing system and/or network, used to implement the D Arithmetic. For example, consider a D Arithmetic table with $10^8$ (100 MegBytes) cells that was generated from a D Scale with a four digit maximum prime number. The particular computer used for an application might not have enough memory to allocate an in-memory table of that size.

A set of numbers that is bigger than the constraint of any particular D Arithmetic, can still use D Arithmetic operations. Each number is represented as a composition of smaller numbers that do have representations in the D Arithmetic table For example, $$0.123456789=0.12345+0.6789*10-5$$

More generally,
If:

$$A=b+c*10^k$$

$$A'=b'+c'*10^{k'}$$

and b, c, b', c' are elements of a D Axithmetic table. Then:

$$A*A'=(b+c*10^k)*(b'+c'*10^{k'})$$

$$=b*b'+b*c'*10^{k'}+b'c*10^k+c*c'*10^{k}*10^{k'}$$

Therefore, A*A' is mapped into the result of the four D Arithmetic multiplication and four addition operations above.

The same technique is applicable to other arithmetic operations on big numbers.

There is a slight performance penalty vis-a-vis the simpler one mapping, because additional mappings are required. The penalty is relatively slight because the cost of each mapping is minimal.

More important, the decomposition of a number with many significant digits into smaller numbers with fewer significant digits necessarily leads to loss of precision. But this loss can be controlled by selecting a set of D Scale prime subscales that provides relatively high resolution through their concatenation into a dense set of scale points.

2.9 D Arithmetic for Transcendental/Trigonometric Functions

Calculations involving trigonometric or transcendental functions can also be performed using D Arithmetic mappings. The key difference between arithmetic and these operations is that the mappings into arithmetic values are decoupled from their order-of-magnitudes. That is, the same pair of normalized measurements will map to one normalized value, regardless of the order-of-magnitudes that the pair may have. In contrast, trigonometric and transcendental functions map to different values depending on the order of magnitude of the input. For instance, $\sin(\theta)$ and $\sin(10*\theta)$ do not map proportionally to a value, and to 10 times that value, respectively. The D Arithmetic accommodates this tight coupling between order-of-magnitude and normalized value, by using a series of mapping sets, with each set applicable to a set of normalized values and a specific order-of-magnitude range. Thus, one 1-dimensional D Arithmetic table would map normalized values with order-of-magnitude of $10^0$, while another table would map the same set of normalized values, but with an order-of-magnitude of $10^1$.

Further, transcendental and trigonometric functions of large measurement numbers can be decomposed into smaller components using the standard operation decompositions for transcendental and trigonometric functions.

For example, $$\sin(\theta_1+\theta_2*10^k)=\sin(\theta_1)*\cos(\theta_2*10^k)+\cos(\theta_1)*\sin(\theta_2*10^k)$$

Then, the D Arithmetic sine tables for $\sin(\theta_1)$ and $\cos(\theta_2*10^k)$ can be mapped into their D Scale values. That pair is then be mapped into a D Scale value using the D Arithmetic multiplication table. The same procedure is applied to the second term, $\cos(\theta_1)*\sin(\theta_2*10^k)$. Finally, the mapping results of each term are input to a D Arithmetic addition mapping set, to yield the final result.

3. Validating the D Arithmetic

A methodology is presented to validate the result of iterative mapping of measurements using the D Arithmetic. This validation provides the assurance that the intermediate results are indeed self-stabilizing, and that the end result is accurate for any number of iterative "calculation" mappings.

The validation procedure is to compare the intermediate result after each iterative step against intermediate results using the benchmark of infinite, or at least high, precision numbers. More specifically, a given set of measurements is processed using the D Arithmetic, the usual infinite (or at least high) precision arithmetic, and the usual arithmetic using the built-in "double" or "float" data types. Three traces are then generated of the intermediate results from iteratively applying the same arithmetic operations on the data set, using the three techniques. That is, one trace is generated by the iterative mappings of the D Arithmetic. The second trace is generated using the infinite precision arithmetic. And the third trace derives from the finite precision arithmetic.

| Iterations | D Arithmetic | Standard (e.g., double) | "Infinite" Precision |
|---|---|---|---|
| 1 | true value#1 ± Δ | true value#1 ± Δ'$_{roundoff}$ | true value#1 |
| m | true value#m ± kΔ | true value#1 + 10 kΔ' | true value#m |

Note that after mn iterations, the D Arithmetic results remain within a tight range about the true value. In contrast, the usual finite precision arithmetic continues to lose precision. The D Arithmetic interval about the actual value can increase in width as more iterations are performed. But this occurs at a slow pace, and is highly improbable. Empirical results as provided in Section 11 confirm this analysis.

4. Sensitivity of D Arithmetic to Random Number Generators

The randomness quality of numbers generated by various pseudo-random number generators can vary wildly. The statistical impact on iterative calculations is to create more of an imbalance or a bias in the mapping of each sample point to its left or right neighbor. But this bias can be mitigated by increasing the precision of the D Scale used for the D Arithmetic, by using higher numbered primes.

5. Implementing D Arithmetic Mappings

The D Arithmetic mappings can be implemented in several ways, depending on the local and networked systems resources available. Three approaches are presented that are feasible with current technology, in order of increasing memory capacity at the cost of a more involved implementation. As technology advances, other techniques should be possible as well. This list does not preclude those cases. The goal of each implementation is to map any two entries in a pair of D Scales into another entry in a D Scale.

5.1 In-Memory Tables

This is the most straightforward approach. On a single CPU, the operating system is instructed to allocate memory within a running process's address space for the required D Arithmetic table(s). This memory is then used as arrays to store the normalized values and the order-of-magnitude offsets. For example, a 4×4 table could contain a D Scale with maximum prime 1001. Then at least 100 MegBytes of memory would have to be allocated. This is well within the capabilities of current computer servers, in the range of $5 k and up.

5.2 Memory Mapped IO Tables

An extension of the technique above is required if the table size increases to the extent that the operating system cannot allocate more memory. For example, a 6×6 D Arithmetic table would require a minimum of 1 GigaByte of main memory, clearly only feasible today on very high-end computers. An efficient and easily implemented alternative is the use of memory mapped I/O. The operating system provides the memory as needed by automatically mapping pages from a disk resident mappings. This is done transparent to the application software. This is a powerful yet commonly available technique, used extensively on Microsoft NT and Sun Solaris operating systems.

5.3 Networked Tree of Tables

When the precision of a D Arithmetic mapping is greater than what one computer host can provide, then a network of computers might be considered. The network is structured logically as a tree. At each branch is the direction indicator for the subsets of digits covered by that subtree.

5.4 Parallel Processing

The arithmetic mappings are decoupled from one another, each only dependent on two inputs. That lends itself well to mainstream, industry standard, parallel processing techniques which can be applied to the implementation techniques described above.

5.5 Custom Hardware Architecture

The D arithmetic mappings can be implemented entirely within hardware semiconductors. The set of mappings or tables of a D Arithmetic instance would be contained within memory. That would substantially reduce or even eliminate the need for the conventional Arithmetic Logic Unit (ALU). A "calculation" would involve table lookups, without the need to move data from memory to registers to ALUs and back again, all coordinated by control signals.

Further, it would be possible to embed customized D Arithmetic instance tables, based on a-priori knowledge of the chip's application domain. Such knowledge includes the range of actual data expected as well as the precision needed.

5.6 Implementation via Optical Computing

The D Arithmetic mappings might also be implemented using optical computing components.

6. Benefits of D Arithmetic/D Scale for Noise Processing

There is a clear commercial need to characterize noise, to include its energy and phase distributions over varying frequency bands (i.e., its complex spectrum) as well as its identifying signature. That would enable commercially significant improvements to existing applications, as well as new applications. For example, it would then be possible to dynamically generate accurate anti-noise from the original noise, in noise cancellation applications. And it would enable better signal detection, prediction and filtering, as well as more definitive determination of noise signature for adaptive equalization and signal separation. There are several challenges to characterizing noise in a commercially viable manner.

One challenge is to find accurate mathematical representations of noise. There have been many attempts at mathematically characterizing and modeling noise, or stochastic signals. Most notable is the Karhunen-Loeve decomposition equation. But their commercial viability is at issue.

Another challenge is to sample noise in a manner that preserves its identifying correlation signature. Even if standard uniform sampling were used at a high enough sampling rate, its uniform sampling might still mask the underlying temporal or spacial correlation of the noise. Signal sampling has a relatively relaxed constraint on the number and location of sample points used. The standard Nyquist sampling rate determines the minimum number of sample points required given a signal's bandwidth, but otherwise does not suggest that one placement of these samples over another is more advantageous. In contrast, noisy data requires many more sample points partly to compensate for the lack of detailed a-priori knowledge of noise bandwidth. But these samples should themselves be irregular to uncover the underlying temporal or spacial correlation that identifies that noise.

Yet another challenge is that the number of samples needed to characterize noise is generally far greater than for signal sampling. Almost by definition, signal points tend to be highly correlated to one another. And there is a tendency for relevant semantic content to reside in only a small fraction of the signal. In contrast, noise sampling should occur across its entire extent to insure that its non-stationary correlation can be accurately determined. But analyzing increasing number of samples leads to the onset of a new noise source, that of floating point arithmetic round off errors. And the standard work-around of partitioning the data set leads to artifact noise as well as additional complexity of implementation.

A commercially viable and attractive approach to noise processing is provided by the combination of the D Arithmetic, D Scale's irregular sampling and the mathematical kernel decompositions made possible by the D Scale (and described in the D Scale patent application). FIG. 12 illustrates how this combination of tools can be applied synergistically to enable noise processing.

Noise processing typically includes the determination of its spacial power distribution and temporal or spacial correlations, applied to noise reduction and cancellation, noise filtering and signal extraction from noise. The D Arithmetic can be used to compute the mathematical kernel decompositions made possible by the D Scale. Together, this combination of tools provides the following benefits that are generally limited in current mainstream industry practice:

6.1 Minimal Bias from Quasi-random Sampling

Irregular, non-uniform, quasi-random sampling of noise is inherently preferable to uniform sampling of the noise. Uniform sampling of noisy data can produce biases or artifacts not present in the actual data. Indeed, irregular sampling can uncover the essential correlation time or distance between noise points. That correlation over the extent of the noise is its essential signature.

One bias occurs because the points between the uniformly sampled points are implicitly assigned values that are extrapolations of the uniformly sampled values. But random data, by definition, does not have predictable, deterministic, values derived from correlation to a neighboring point. Thus, an implicit correlation leads to an artifact.

A second bias occurs because it is generally not practical, cost effective or feasible to uniformly sample noisy data at the high rate (or bandwidth) required to authentically replicate a noise signal. Therefore a bias occurs because the sampling rate is generally not high enough. In contrast, irregular sampling using the D Scale has an effective bandwidth of as many orders-of-magnitude higher as the maximum possible sampling rate of the D Scale used.

6.2 Reduced Round-off Error Artifact in Noise Processing

The round-off errors inherent in standard arithmetic based noise calculations effectively add new noise to the measurements. Further, more accurate noise processing requires the use of as large a data set of raw samples as is possible. But that only adds more effective noise from the unbounded round-off errors. Arithmetic based error bias must be either bounded or managed to prevent additional bias in noise calculations.

6.3 Enables Processing of Complete Noise Data Set

Typically, large sample data sets are partitioned into smaller sets for noise processing and analysis. The main reason is that that is the only way to bound the explosion of round-off errors. But this introduces distortions in the analysis because the set of sets of data results must then be somehow combined in a manner that never existed in the original data. Further, the impact of bounding each set is to create more artifacts due to the abrupt discontinuity at the partition boundaries. The industry standard use of "windows" to mitigate this partition boundary effect can only go so far.

7. Commercial Noise Processing Applications of the D Arithmetic/D Scale

7.1 Noise Cancellation

The noise spectrum consists of its amplitude and whatever meaningful coherent phase, both as a function of frequency. The amplitude squared is the noise power which is useful for filtering and signal detection. And the phase, or degree of correlation to other noisy signals, is useful for adaptive equalization and noise cancellation. The combined use of the D Arithmetic, D Scale, and the D Scale derived Fourier and wavelet kernel transformation decompositions enable the noise spectrum to be authentically and precisely calculated. Authenticity is provided by the D Scale derived Fourier and wavelet kernel transformation decompositions. And precision stability is provided by the D Arithmetic mapping. When contrasting the decomposition indicated below to the standard Karhunun-Loueve decomposition, more commercially useful features are apparent in this decomposition.

This enables the generation or synthesis of necessarily accurate anti-noise by reversing the signs of the amplitude and phase components of the Fourier/wavelet decomposition coefficients, shown above. The anti-noise can be fed back to the communications channel to interfere destructively with the ambient noise in the channel and thereby reduce the quiescent noise level of the channel. While there are many patented noise cancellation techniques, this one relies on the D Scale and D Arithmetic to provide a true replica of the noise that will be canceled.

7.2 Adaptive Equalization

Adaptive equalization is a process by which the communications characteristics (the transfer function in communications parlance) of a channel are dynamically changed. This is typically done by changing the coefficients corresponding to the taps in a transverse filter. Its benefit is in equalizing the uneven amplitude and phase distortions due to a communication channel's typically nonlinear transfer function characteristic. As in the case above, the D Arithmetic and D Scale provide accurate modeling of the communications channel. That can be used to increase the accuracy of changes to the taps in the existing industry standard and practiced adaptive equalization implementations.

A technique to characterize a communication channel is described. A set of signals corresponding to the D Scale primes, is applied to the channel. Within each prime scale, the phase, frequency and amplitude are varied. The outputs for each input signal are then merged to form a realistic transfer function or spectrum of that channel. Further, the signals can be reapplied periodically, to dynamically readjust the channel's spectrum. This works because any signal can be decomposed into these prime signals. Therefore, it can be made yet more accurate by using the signal's decomposition, if it is known a-priori.

7.3 Signal Detection

Signal detection involves the determination, within a pre-specified high probability, that a signal is present in noisy data. Practical implementations of signal detection devices rely on mathematical models of the expected noise. Typically, the model is simplified by assuming that a the noise has a Gaussian distribution of amplitude value. In contrast, the combination of D Arithmetic, D Scale and kernel distributions enable more accurate models of empirical data.

7.4 Synthesis of Noisy Signals

A ramification of the combined D Arithmetic and D Scale, to include the Fourier transform decomposition, is that signals and noise can be generated using its signal/noise decomposition equations.

8. Other Commercial Applications of the D Arithmetic

Several immediately applicable commercial uses of the D Arithmetic and D Scale sampling are noted.

8.1 2D/3D Image Processing 2D and 3D images are processed similarly to 1D signals. The spectrum calculated is of space as a function of spatial frequency, instead of time as a function of the frequency. As with 1D signals, processing includes filtering, noise reduction as well as edge determination. In particular, the D Arithmetic combined with the D Scale enable the calculation of a Fourier Transform of an image without block partitioning. The industry standard image processing practice is to partition an image into many blocks. A primary reason is minimize the impact of round-off errors when performing many FFT calculations from 2D or 3D samples. But this leads to degradation in the generated image due to the appearance of artifacts in the image at the boundaries of the blocks.

9. Construction of a D Arithmetic—An Example

A sample D Arithmetic mapping table is constructed by following the steps described in the previous sections.

9.1 Construction of a D Scale

First, a D Scale is constructed. Its construction is guided by the application of it, and specifically the measurement resolution or precision required by the application. The following steps are taken to create a D Scale.

9.1.1 Select PrimeNumbers for the D Scale's Sub-scales

A set of prime numbers must first be selected for their corresponding sub-scales to comprise the D Scale. This decision on which primes to use is determined by the needed maximum and average resolution or precision. The maximum possible resolution is calculated by the reciprocal of the highest prime selected. And the average resolution is determined by the density of points resulting from the union of these prime sub-scales. A sparse set of primes can lead to a desired maximum resolution. But it then misses the main benefit of a densely populated D Scale. As explained in Section 6.1, on in-Memory Tables, this density of D Scale points provides leverage by creating an effective resolution that is orders of magnitude greater than that possible using the standard uniform decimal scale.

For this example, 11 sub-scales are used, with these prime numbers:

See FIG. 14

9.1.2 D Scale Construction

For each prime number selected above, there is a corresponding set of points on the unit interval of the form k/p, where p is a prime and k=1,2.(p−1). Thus, p2={0, 1/2, 1}
p3={1/3, 2/3}
p37={1/37, 2/37 . . . 35/37, 36/37}

Note that the endpoints, 0 and 1, are included in the D Scale and assigned by convention to the first prime. A D Scale on the unit interval is constructed by concatenating, or merging, all of the points in all of these sets associated with the prime scales comprising the D Scale. The resulting set of points comprising the D Scale is:

See FIG. 15

9.1.3 Determination of Measurement Resolution

The resolution of the D Scale varies with position along the scale. The maximum resolution is determined by the minimum of all distances between each pair of adjacent scale points. The Mathematica vector "delta" below contains the distance between two adjacent scale points, as a function of position in the D Scale.

Figures 16, 17:
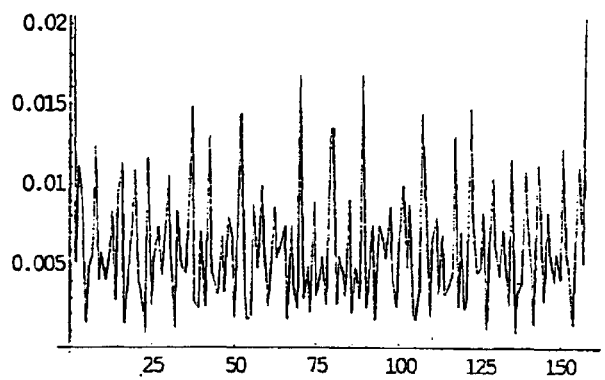
FIG. 16 depicts the distribution of differences between adjacent D scale points.
FIG. 17 is a graph depicting the distribution of differences between adjacent D scale points.

See FIG. 16

Its graph depicts the distribution of scale resolution, as follows:

See FIG. 17

The maximum possible resolution of points with this scale is 1/37 (0.027027), where 37 is the highest prime in this D Scale. But as this graph shows, the effective resolution, determined by the mean and variance of the distribution of deltas, is an order of magnitude smaller, at 0.0075. This graph highlights one of the key features of the D Arithmetic, that far fewer points than a uniform sampling scale can lead to a higher effective resolution.

Also, the D Scale has a precision of between 2 and 3 digits, because 1/37 is between 1/10 and 1/100.

9.2 Construction of a D Arithmetic Table from the D Scale

9.2.1 Calculate Cross Product of D Scale

The cross product of the D Scale with itself is calculated by multiplying each pair of points, one from each scale. This also includes pairs with the same point. The multiplication operations uses the industry standard floating point arithmetic. Note that the cross product of two different D Scales can be used. But to simplify this walk-through, the previously constructed D Scale is used as both factors in the cross product.

9.2.2 Normalize Cross Product Results

If the cross product values were mapped as is, to D Scale points, then the mappings could be biased unnaturally towards the low end of the scale. Consider that each number between 0 and 1 has a decimal component that is between 0.1 and 0.9, as well as an order of magnitude component. Then a cross product value's order of magnitude is the sum of its two factors' order of magnitudes. Thus the multiplication of two low end numbers on the D Scale whose order of magnitude is −1 (i.e., 0.0n) would result in a value with an order of magnitude of −2. That could map to the lowest, or to one of the lowest, D Scale numbers. Following this example shows the drift of mappings towards the low end of the D Scale.

Each calculated value is normalized to avoid this bias, by decoupling the order of magnitude of each cross product result from its intrinsic value. The normalization procedure will map each cross product result to two entities, a value and an order of magnitude. In one implementation, both entities are associated with the same cell in a table. Or in another implementation, separate tables are used for each entity, and where each cell has a counterpart in the other.

Normalization starts by determining the maximum order of magnitude among the D Scale points used by the D Arithmetic. For this particular D Scale, that base order of magnitude is −1. Then each cross product result is accepted as is, if the result's order of magnitude is equal to or less than the base order of magnitude. In that case, a zero value is associated with that result's order of magnitude entity. Or, if the result's order of magnitude is greater than the base, then the value is multiplied by the base order of magnitude to serve as the new value that will be mapped to a D Scale point. And the difference between the original order of magnitude and the base becomes associated with the mapped value's order of magnitude entity.

9.2.3 Map Normalized Cross Product Values to D Scale

Finally, each normalized number is mapped to its nearest D Scale neighbor as described, and proved, in the D Scale patent application. It is also possible to randomly map the normalized value to it left or right D Scale neighbor. But that reduces the replicability, and therefore the portability, of the set of mapping. This is due to the variability in behavior of different random number generators. Also, as explained in the next section, an element of randomness is introduced when mapping measurement samples to D Scale points.

A sample is shown below, of row 20 of the D Arithmetic table constructed from this D Scale mappings of normalized cross products.

See FIG. 18

The associated order-of-magnitudes for the D Arithmetic values in row 80 are arranged in the following table. Note that in other implementations, both the order of magnitude and the D Scale values could be part of the same table, if that is how the table's data structure was organized.

See FIG. 19

9.3 Mapping Measurement Sample Point to D Scale

Each measurement sample point is mapped to a D Scale point using the algorithm described, and proved, in the D Scale patent application. These mapped D Scale points then serve as proxies to the actual samples. They are then used in all arithmetic and trigonometric calculations instead of the actual measurements.

10. Examples of D Arithmetic Table Mappings

Two examples of the D Arithmetic are presented. The first example is the simplest case, whereby a number is iteratively multiplied by itself in a succession of powers. It provides a quick, intuitive, reality check on the broad D Arithmetic behavior. The second example iteratively multiplies a sequence of randomly generated numbers between 0 and 1. It simulates, to some degree, the noise processing behavior of the D Arithmetic. Together, these two tests bound the continuum of correlations that can exist a data sets, from 100% correlation, when the numbers are identical, to ideally 0% correlation, when the numbers are randomly generated. These tests verified that the D Arithmetic is not biased by any degree of correlation among points in the data set used.

10.1 Powers of a Number Example

A sample number is multiplied by itself many times. This simple case will highlight the behavior of the iterative calculations using high precision, low precision and the D Arithmetic.

10.1.1 Selecting a Number

The number selected is 0.4888. It lies between 18/37 and ½ on the D Scale, closer to 18/37.

10.1.2 Testing the D Scale Mappings of Random Numbers

Figure 20:
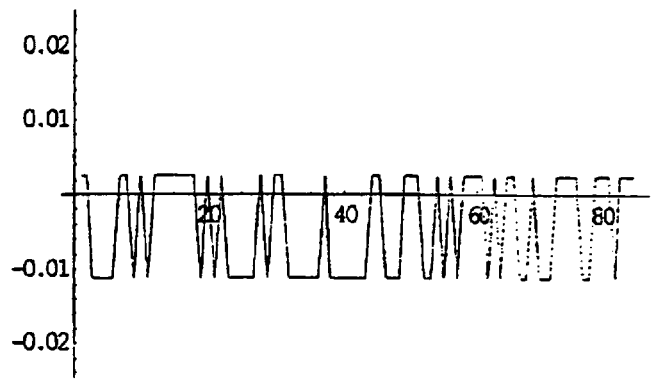
FIG. 20 is a graph depicting differences between measurements and mapped values.

Each instance of this number in the data set was mapped to points in the D Scale, according to the mapping algorithm described previously. The set of differences between each number and its mapped D Scale point was graphed, as shown below:

See FIG. 20

The actual numbers and their D Scale mappings used to generate this graph, are indicated below:

See FIG. 21

10.1.3 Discussion of Results

Note from the graph in FIG. 20 that the differences between actual and mapped values oscillates about 0 in a square wave pattern. This is a manifestation of randomly choosing left or right neighbors for each mapping. Some points are greater than the genuine value, while others are below, creating the undulating pattern. This clearly shows that the mapped values are greater than, and less than, the actual values in relatively equal numbers, as expected from using the random number decision maker.

Note the asymmetry about the x axis. This graphically illustrates that the sample point 0.4888 is closer to its left D Scale neighbor, 0.4864, than to its right D Scale neighbor, 0.50.

Also, according to the theory, presented in a previous section, the cumulative result should be within a few maximum resolutions of the actual value, determined using infinite precision arithmetic. And that is what was observed in the graph, where the range of differences consistently remained within a well defined band of about±0.01. That width is roughly the average resolution of the D Scale used, per the discussion in Section 10.3.1. This graph confirmed that the D Scale mapping did yield values that were guaranteed to lie within a known, and controlled range about the actual measurements.

10.1.4 Iterative Mappings of Selected Number 800 iterative calculations were performed. One array below contains the intermediate values using high precision. Another array contains the D Arithmetic table's cell values into which the original values were mapped to. The order-of-magnitude offsets associated with an D Arithmetic entry is also saved in another array.

11.1.5 Methodology to Test the D Arithmetic

Three sets of iterative multiplication operations were performed.

First, the generated measurement numbers were iteratively multiplied using "infinite" precision to yield true values. (Actually, the built-in "double" precision was adequate for the test). These intermediate and final calculated values served as the benchmark from which to compare corresponding values using the other arithmetic approaches.

Second, the limited precision case used the same measurements, but truncated to 3 digit precision, to hasten the onset of round-off digit erosion when iteratively multiplying the numbers.

Third, the D Arithmetic's multiplication was then applied to the D Scale mapped measurement values. Recall that the D Scale used had a precision of between 2 and 3 digits.

10.1.6 Test Results

10.1.6.1 (D Arithmetic—Benchmark High Precision) vs. Iterations

Figure 22:
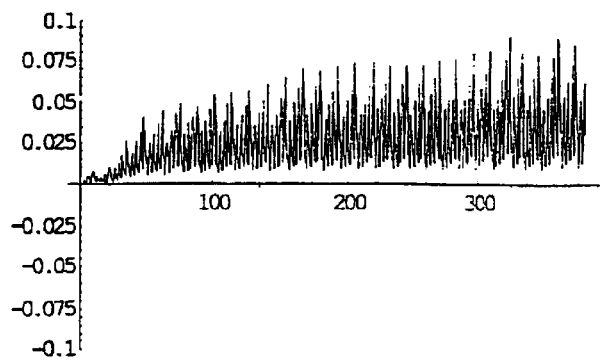
FIG. 22 is a graph of a D arithmetic benchmark vs. the number of iterative multiplications at 300 iterations.
Figure 23:
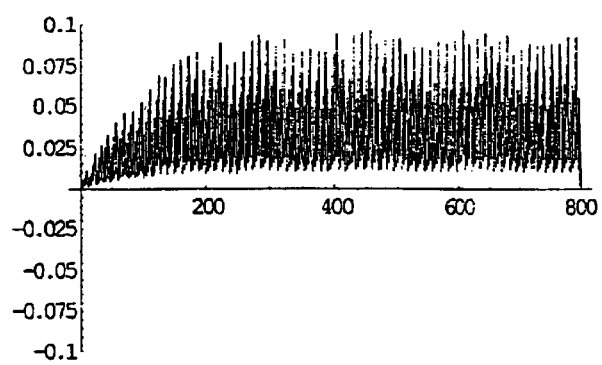
FIG. 23 is a graph of a D arithmetic benchmark vs. the number of iterative multiplications at 800 iterations.

See FIG. 22 graphs the intermediate differences between D Arithmetic and benchmark results vs. the number of calculations performed (i.e., the number of points in the set already included in the iterative calculations). See FIG. 23 shows the same results plotted out to 800 points. Note how the self stabilization maintains the error within a well defined range even as the number of calculations increases.

Note the periodic pattern. This occurs because the multiplication table used is small enough that the iteration pattern will return to the same initial value. Further iterative multiplication of that value are then memory-less, and proceed as they did previously.

Finally, there is an offset from the 0 level due to an inconsequential order of magnitude offset that is an artifact of this implementation.

10.1.6.2 (Standard Precision—Benchmark High Precision) vs. Iterations

Figure 24:
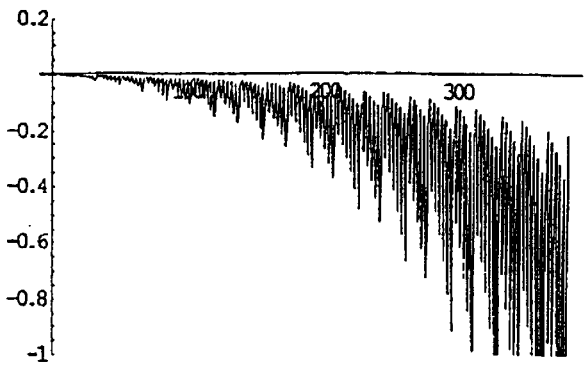
FIG. 24 is a graph of a limited precision D arithmetic benchmark vs. the number of iterative multiplications at 350 iterations.

See FIG. 24 graphs the intermediate differences between limited precision arithmetic and benchmark results vs. the number of calculations performed.

10.1.7 Discussion of Test Results

10.1.7.1 (D Arithmetic—Benchmark High Precision) vs. Iterations

See FIGS. 22 and FIG. 23 confirms the theoretical analysis of the D Arithmetic self-stabilization property. Note that the results are well within a calculable range of the true results, even as the number of iterations increases.

10.1.7.2 (Standard Precision—Benchmark High Precision) vs. Iterations

Figure 25:
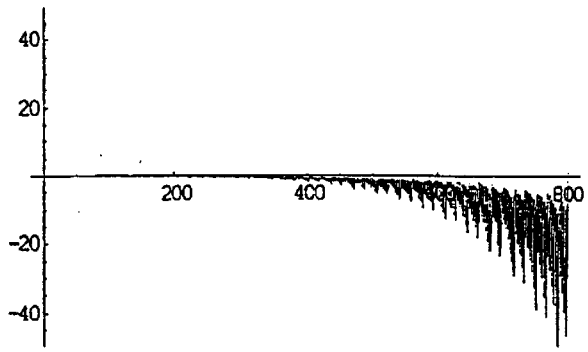
FIG. 25 is a graph of a limited precision D arithmetic benchmark vs. the number of iterative multiplications at 800 iterations.

In contrast, the impact of round-off errors on the usual floating point arithmetic is apparent in FIGS. 24 and FIG. 25. Its results become increasingly unstable, unreliable, and diverge significantly from the benchmark values, as the number of iterations increases. And most important, the industry standard approach lacks a correcting or self-stabilizing mechanism.

10.2 Noise Processing Example

In this example, a random set of 85 floating point numbers was iteratively multiplied. This small data set was used to conveniently present the intermediate calculations of the various trials for independent verification.

10.2.1 Testing the D Scale Mappings of Random Numbers

Figure 26:
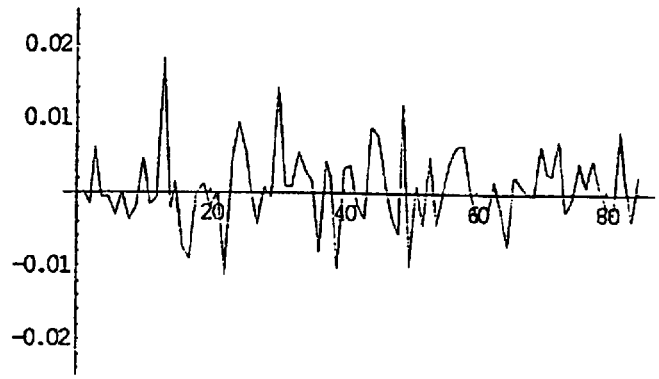
FIG. 26 is a graph of mapped values vs. measurement number.

Each randomly generated number in the data set was mapped to points in the D Scale, according to the mapping algorithm described previously. The set of differences between each number and its mapped D Scale point was graphed, as shown below:

See FIG. 26

The actual numbers and their D Scale mappings used to generate this graph, are indicated below:

See FIG. 27

10.2.2 Discussion of Results

Note from graph in FIG. 26 that the differences between actual and mapped values oscillated about 0. This is a manifestation of randomly choosing left or right neighbors for each mapping. Some points are greater than the genuine value, while others are below, creating the undulating pattern. This clearly shows that the mapped values are greater than, and less than, the actual values in relatively equal numbers, as expected from using the random number decision maker.

Also, according to the theory, presented in a previous section, the cumulative result should be within a few maximum resolutions of the actual value, determined using infinite precision arithmetic. And that is what was observed in the graph, where the range of differences consistently remained within a well defined band of about±0.01. That width is roughly the average resolution of the D Scale used, per the discussion in Section 10.3.1. This graph confirmed that the D Scale mapping did yield values that were guaranteed to lie within a known, and controlled range about the actual measurements.

10.2.3 Methodology to Test the D Arithmetic

Three sets of iterative multiplication operations were performed.

First, the generated measurement numbers were iteratively multiplied using "infinite" precision to yield true values. (Actually, the built-in "double" precision was adequate for the test). These intermediate and final calculated values served as the benchmark from which to compare corresponding values using the other arithmetic approaches.

See FIG. 28

Actual values uses are listed, for independent validation of the multiple iterative operations performed:

See FIG. 29

Second, the D Arithmetic's multiplication was then applied to the D Scale mapped measurement values. Recall that the D Scale used had a precision of between 2 and 3 digits.

See FIG. 30

Actual values uses are listed, for independent validation of the multiple iterative operations performed:

See FIG. 31

Third, the limited precision case used the same measurements, but truncated to 3 digit precision, to be comparable to the D Arithmetic precision used.

See FIG. 32

Actual values uses are listed, for independent validation of the multiple iterative operations performed:

See FIG. 33

10.2.4 Test Results 10.2.4.1 (D Arithmetic Benchmark High Precision) vs. Iterations See FIG. 33 graphs the intermediate differences between D Arithmetic and benchmark results vs. the number of calculations performed (i.e., the number of points in the set already included in the iterative calculations).

Figure 34:
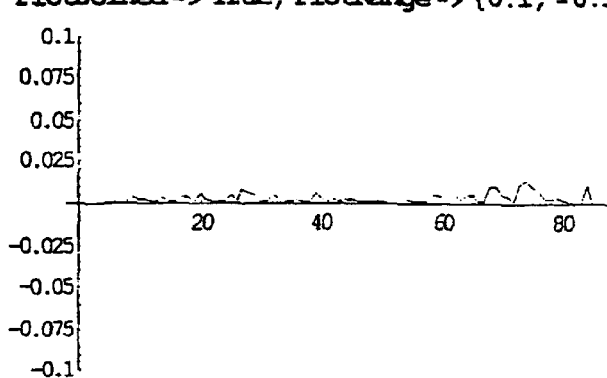
FIG. 34 is a graph of a D arithmetic benchmark vs. the number of iterative multiplications.

See FIG. 34

10.2.4.2 (Standard Precision—Benchmark High Precision) vs. Iterations

FIG. 34 graphs the intermediate differences between limited precision arithmetic and benchmark results vs. the number of calculations performed.

Figure 35:
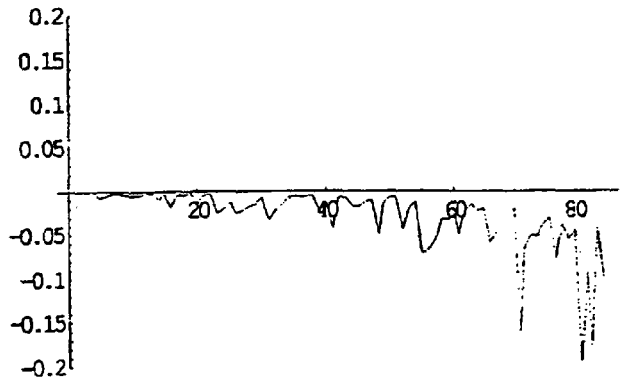
FIG. 35 is a graph of a limited precision benchmark vs. the number of iterative multiplications.

See FIG. 35

10.2.5 Discussion of Test Results 10.2.5.1 (D Arithmetic—Benchmark High Precision) vs. Iterations FIG. 34 confirms the theoretical analysis of the toolkit's self-stabilization property. Note that the toolkit results are well within a calculable range of the true results, even as the number of iterations increases.

10.2.5.2 (Standard Precision—Benchmark High Precision) vs. Iterations

In contrast, the impact of round-off errors on the usual floating point arithmetic is apparent in FIG. 35. Its results become increasingly unstable, unreliable, and diverge significantly from the benchmark values, as the number of iterations increases. And most important, the industry standard approach lacks a correcting or self-stabilizing mechanism. Note again that 3 digit precision was used to hasten the manifestation of round-off errors.

What is claimed is:

1. A method for signal processing comprising performing arithmetical calculations comprising a mapping from the domain of pairs of points in a D scale to a range of points in a D scale, and an algorithm for mapping measured or sampled values into a D scale.

2. The method of claim 1 further comprising controlling the variance of resolution by using a plurality of D sub-scales to fill the D scale.

3. The method of claim 2 wherein such mappings are dual arithmetical operations.

4. The method of claim 2 wherein such mappings are floating point arithmetical operations.

5. The method of claim 2 wherein such mappings are stored in a read only device.

6. The method of claim 2, wherein discrete Fourier transforms of sample points are calculated.

7. The method of claim 2 wherein an interactive calculation with decomposition of kernel integrals is performed.

8. The method of claim 7 further comprising selecting a D scale point adjacent to an actual data value.

9. The method of claim 2 wherein said D scale provides discrete points of the form $n/p<1$, where p is prime.

10. The method of claim 2 wherein said sampled points comprise a table whose cells contain the values from a D scale.

11. The method of claim 10, wherein said table is in a memory, a file, a database table, or distributed over a network.

12. The method of claim 10, wherein said table is distributed over a optical fiber interactive network.

13. The method of claim 10, wherein such table is calculated when needed.

14. The method of claim 12, wherein the method of selecting a D scale point is accomplished by randomly selecting an adjacent higher point or and adjacent lower point.

15. The method of claim 12, wherein the method of selecting a D scale point is accomplished by selecting the nearest D scale value.

16. The method of claim 12 wherein the points are determined by a D scale measurement sampling algorithm.

17. Apparatus for processing a digital signal, comprising a computer having a memory storing a table of D scale values and an algorithm for mapping computed numerical values into values in said table said apparatus lacking an arithmetic logical unit during creation, said algorithm lacking the step of moving data from a memory to registers to an arithmetic logical unit.

18. The apparatus of claim 17, wherein said algorithm lacks the step of moving data from a memory to registers to an arithmetic logical unit.

19. Apparatus for processing a digital signal, comprising a computer having D scale arithmetic instance tables generated from a range of actual or expected data and a predetermined required precision.

20. Apparatus for characterizing noise, including its energy and phase distributions over frequency bands comprising a computer having a memory storing a table of D scale values and an algorithm for mapping computed numerical values into values in said table said apparatus lacking a arithmetic logical unit.

21. Apparatus for characterizing noise and its identifying signature, including its energy and phase distributions over frequency bands comprising a computer having a memory storing a table of D scale values and an algorithm for mapping computed numerical values into values in said table said apparatus lacking a arithmetic logical unit.

22. Apparatus for dynamically generating anti-noise from original noise and canceling said noise comprising a computer having a memory storing a table of D scale values and an algorithm for mapping computed numerical values into values in said table said apparatus lacking a arithmetic logical unit.

23. Apparatus for determining noise signature for adaptive equalization and signal separation comprising a computer having a memory storing a table of D scale values and an algorithm for mapping computed numerical values into values in said table said apparatus lacking a arithmetic logical unit.

24. Apparatus for sampling noise while preserving its correlation signature comprising a computer having a memory storing a table of D scale values and an algorithm for mapping computed numerical values into values in said table said apparatus lacking a arithmetic logical unit.

25. Apparatus for noise processing comprising D scale arithmetic with D Scale irregular sampling and mathematical kernel decomposition comprising a computer having a memory storing a table of D scale values and an algorithm for mapping computed numerical values into values in said table said apparatus lacking a arithmetic logical unit.

26. Apparatus for determining the spectral power dissipation of noise and its temporal or spacial correlations, and applying such determination to noise reduction comprising a computer having a memory storing a table of D scale values and an algorithm for mapping computed numerical values into values in said table said apparatus lacking a arithmetic logical unit.

27. The apparatus of claim 26, wherein uneven amplitude and phase distortions due to a communication channel's nonlinear transfer function characteristic are changed.

28. Apparatus employing D Arithmetic and D Scale derived Fourier and wavelet kernel transformation decomposition to decompose a noise spectrum comprising a computer having a memory storing a table of D scale values and an algorithm for mapping computed numerical values into values in said table said apparatus lacking a arithmetic logical unit.

29. Apparatus for digital filtering to dynamically change the transfer function of a communications channel by changing the coefficients corresponding to the taps in a transverse filter comprising a computer having a memory storing a table of D scale values and an algorithm for mapping computed numerical values into values in said table said apparatus lacking a arithmetic logical unit.

* * * * *